United States Patent
Eisen et al.

(10) Patent No.: US 10,601,859 B2
(45) Date of Patent: Mar. 24, 2020

(54) ANTI-REPLAY SYSTEMS AND METHODS

(71) Applicant: Trusona, Inc., Scottsdale, AZ (US)

(72) Inventors: Ori Eisen, Scottsdale, AZ (US); David Kopack, Scottsdale, AZ (US); Clayton Lengel-Zigich, Scottsdale, AZ (US); Nikolas Mangu-Thitu, Lexington, KY (US)

(73) Assignee: Trusona, Inc., Scottsdale, AZ (US)

( * ) Notice: Subject to any disclaimer, the term of this patent is extended or adjusted under 35 U.S.C. 154(b) by 182 days.

(21) Appl. No.: 15/441,661

(22) Filed: Feb. 24, 2017

(65) Prior Publication Data

US 2017/0251014 A1    Aug. 31, 2017

Related U.S. Application Data

(60) Provisional application No. 62/300,005, filed on Feb. 25, 2016.

(51) Int. Cl.
    *H04L 29/06*          (2006.01)
    *G07F 7/08*            (2006.01)
    (Continued)

(52) U.S. Cl.
    CPC ........ *H04L 63/1441* (2013.01); *G06F 11/302* (2013.01); *G06F 11/3495* (2013.01);
    (Continued)

(58) Field of Classification Search
    CPC ............. H04L 63/1441; H04L 63/0876; H04L 63/0846; G06F 11/3495; G06F 11/302; G06Q 20/4016
    See application file for complete search history.

(56) References Cited

U.S. PATENT DOCUMENTS

| | | |
|---|---|---|
| 5,913,542 A | 6/1999 | Belucci et al. |
| 7,379,921 B1 | 5/2008 | Kiliccote |
| (Continued) | | |

FOREIGN PATENT DOCUMENTS

| | | |
|---|---|---|
| JP | 4961214 B2 | 6/2012 |
| WO | WO-2014075011 A1 | 5/2014 |
| (Continued) | | |

OTHER PUBLICATIONS

International Search Report and Written Opinion dated May 15, 2017 for International PCT Patent Application No. PCT/US2017/019454.

(Continued)

*Primary Examiner* — Matthew T Henning
(74) *Attorney, Agent, or Firm* — Wilson Sonsini Goodrich & Rosati

(57) ABSTRACT

Systems and methods for detecting replay attacks may use one or more sensors to collect data about a state of a device. The device may be used to perform a transaction. The device may be used to authenticate or identify a user. The state of the device may pertain to a characteristic of the device position, movement, component, or may pertain to one or more environmental conditions around the device. The state of the device may be expected to change over time, and certain states are unlikely to be repeated. The detected repetition of a state of the device may be a cause for increasing the likelihood that a replay attack is taking place.

19 Claims, 10 Drawing Sheets

(51) Int. Cl.
  *G06F 11/30*  (2006.01)
  *G06F 11/34*  (2006.01)
  *G06Q 20/40*  (2012.01)
(52) U.S. Cl.
  CPC ....... *G06Q 20/4016* (2013.01); *G07F 7/0873* (2013.01); *H04L 63/0846* (2013.01); *H04L 63/0876* (2013.01)

(56) References Cited

U.S. PATENT DOCUMENTS

| | | | |
|---|---|---|---|
| 7,578,436 | B1 | 8/2009 | Kiliccote et al. |
| 7,613,929 | B2 | 11/2009 | Cohen et al. |
| 8,291,220 | B2 | 10/2012 | Singh |
| 8,385,971 | B2 | 2/2013 | Rhoads et al. |
| 8,550,903 | B2 | 10/2013 | Lyons et al. |
| 8,655,782 | B2 | 2/2014 | Poon et al. |
| 8,805,110 | B2 | 8/2014 | Rodriguez et al. |
| 8,929,877 | B2 | 1/2015 | Rhoads et al. |
| 8,973,095 | B2 | 3/2015 | Smith et al. |
| 8,983,207 | B1 | 3/2015 | Ran et al. |
| 9,118,662 | B2 | 8/2015 | Corrion et al. |
| 9,143,496 | B2 | 9/2015 | Etchegoyen |
| 9,596,237 | B2 | 3/2017 | Law et al. |
| 2007/0063050 | A1 | 3/2007 | Attia et al. |
| 2007/0102521 | A1 | 5/2007 | Petersson et al. |
| 2009/0150294 | A1 | 6/2009 | March et al. |
| 2010/0268949 | A1 | 10/2010 | Schuetze |
| 2011/0200234 | A1 | 8/2011 | Takahashi et al. |
| 2011/0219427 | A1 | 9/2011 | Hito et al. |
| 2012/0150742 | A1* | 6/2012 | Poon ................ G06Q 20/20 705/44 |
| 2013/0116964 | A1 | 5/2013 | Van Roermund et al. |
| 2014/0105449 | A1 | 4/2014 | Caton et al. |
| 2014/0282933 | A1* | 9/2014 | Etchegoyen ............. H04L 9/32 726/5 |
| 2014/0337930 | A1 | 11/2014 | Hoyos et al. |
| 2015/0178724 | A1* | 6/2015 | Ngo .................... H04L 9/0869 705/71 |
| 2015/0254443 | A1 | 9/2015 | Blessing et al. |
| 2015/0365238 | A1* | 12/2015 | Hui ..................... H04L 9/3247 713/178 |
| 2016/0057248 | A1* | 2/2016 | Tankha ................ H04L 67/306 726/6 |
| 2016/0140357 | A1* | 5/2016 | Newell ................ G06F 3/0679 726/2 |
| 2019/0147159 | A1 | 5/2019 | Eisen |

FOREIGN PATENT DOCUMENTS

| | | |
|---|---|---|
| WO | WO-2016141352 A1 | 9/2016 |
| WO | WO-2017147494 A1 | 8/2017 |
| WO | WO-2018022993 A1 | 2/2018 |

OTHER PUBLICATIONS

International Search Report and Written Opinion dated Nov. 1, 2017 for International Patent Application No. PCT/US2017/044371.
EP17757353.2 The Extended European Search Report dated Jun. 11, 2019.
PCT/US2019/047964 International Search Report dated Dec. 13, 2019.

* cited by examiner

| TRANSACTION ID | TRANSACTION DATA | NONCE DATA |
|---|---|---|
| TID 1 | TD 1 | ND 1 |
| TID 2 | TD 2 | ND 2 |
| TID 3 | TD 1 | ND 3 |
| TID 4 | TD 2 | ND 2 |
| ⋮ | ⋮ | ⋮ |

FIG. 7

ANTI-REPLAY SYSTEMS AND METHODS

CROSS-REFERENCE TO RELATED APPLICATIONS

This application claims the priority and benefit of U.S. Provisional Application No. 62/300,005 filed on Feb. 25, 2016, the entire contents of which are incorporated herein by reference.

BACKGROUND OF THE INVENTION

Replay attacks play a large role in fraudulent transactions, particularly electronic transactions. In a replay attack, data from an earlier transaction is recorded and then played again in a new transaction, particularly to authenticate a user or device.

During large financial transactions, or frequently occurring financial transactions, replay attacks become particularly concerning. With the increase of online transactions, individuals can conduct financial transactions fairly anonymously, and it becomes easier to collect and record data from earlier transactions to replay them.

SUMMARY OF THE INVENTION

Accordingly, a need exists for improved systems and methods for detecting fraudulent transactions, particularly relating to replay attacks. A device may be used during a financial transaction. For instance, the device may permit a user to perform an electronic transaction and/or may be used to access a user account or authenticate an identification of the user. Data relating to the device may be collected at the time of a transaction. The data relating to the device may be used to create a singularity value or a 'nonce' which may not be repeated, or is extremely unlikely to be repeated. If nonce data is identically repeated in a subsequent transaction, it may raise a red flag that may indicate that the subsequent transaction is a likely replay attack, since it extremely unlikely the nonce data would repeat.

In one aspect of the invention, a method of performing anti-replay analysis is provided. The method comprises: providing a device configured to permit a user to perform a transaction with a transaction entity over a network; collecting, with aid of one or more sensors on-board the device, device state data about a physical state of the device that is unique to the device at a moment in time during which the device state data is collected; obtaining identification information about the device or the user; comparing, with aid of one or more processors, the device state data and the identification information with previously collected device state data and previously collected identification information; and making a determination of a presence of a replay attack when the device state data and the previously collected device state data are identical.

In some embodiments, the method further comprises determining whether the device state data is valid by checking a value of at least a portion of the device state data is within a pre-defined range. In some embodiments, the device state data comprises data collected by different types of sensors and the data collected by different types of sensors have different weights when determining the presence of the replay attack. In some cases, the device state data is encrypted such that the data collected by the different types of sensors are not accessible. Alternatively, the device state data is not encrypted, and wherein the data collected by the different types of sensors are individually compared with the previously collected device state data according to the types of sensors to determine the presence of the replay attack.

In some embodiments, the one or more sensors comprises inertial sensors including accelerometers, gyroscopes, magnetometers, or piezoelectric sensors. In some embodiments, the one or more sensors comprises an audio sensor, an image sensor, or a temperature sensor.

In some embodiments, the device state data comprises positional information about the device. In some embodiments, the device state data further comprises data indicative of environmental information collected by the one or more sensors on-board the device and in some cases, the data indicative of environmental information includes visual, thermal, or audio data about the environment. In some embodiments, the method further comprises collecting local data that are not collected by the one or more sensors and the local data is indicative of a physical state of a component of the device, and wherein the component is selected from the group comprising a power supply unit, a processor, a sensor, and a memory. In some cases, the local data includes information about an operational state of the sensor, a level of usage of the processor, the power supply unit or the memory.

In some embodiments, the transaction performed via using the device involves exchange of money, goods, services, or information. In some embodiments, the transaction is performed with a transaction entity over a network.

In a separate yet related aspect of the invention, a system of performing anti-replay analysis is provided. The system comprises: a server in communication with a device configured to permit a user to perform a transaction, wherein the server comprises (i) a memory for storing previously collected device state data, previously collected identification information, and a first set of software instructions, and (ii) one or more processors configured to execute the first set of software instructions to: receive device state data about a physical state of the device that is unique to the device at a moment in time during which the device state data is collected, wherein the device state data is collected with aid of one or more sensors on-board the device; receive device state data about a physical state of the device that is unique to the device at a moment in time during which the device state data is collected, wherein the device state data is collected with aid of one or more sensors on-board the device; compare, the device state data and the identification information with the previously collected device state data and the previously collected identification information; and determine a presence of a replay attack based on whether the device state data and the previously collected device state data are identical.

In a separate yet related aspect of the invention, a tangible computer readable medium storing instructions that, when executed by one or more servers, causes the one or more servers to perform a computer-implemented method for performing anti-replay analysis is provided. The method comprises: collecting, with aid of one or more sensors on a device, device state data about a physical state of the device that is unique to the device at a moment in time during which the device state data is collected, and wherein the device is configured to permit a user to perform a transaction; obtaining identification information about the device or the user; comparing, with aid of one or more processors, the device state data and the identification information with previously collected device state data and previously collected identification information; and determining, with the aid of the one or more processors, a presence of a replay attack based on whether the device state data and the previously collected device state data are identical.

In some embodiments, the device state data further comprises data indicative of environmental information collected by the one or more sensors on-board the device and the one or more sensors comprises at least an image sensor.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the present invention will be obtained by reference to the following detailed description that sets forth illustrative embodiments, in which the principles of the invention are utilized, and the accompanying drawings of which:

FIG. 7 shows examples of how data may be stored for various transactions, in accordance with embodiments of the invention.

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for detecting replay attacks using singularity values. Various aspects of the invention described herein may be applied to any of the particular applications set forth below. The invention may be applied as a standalone anti-replay system or as a component of an integrated financial transaction or fraud detection software. It shall be understood that different aspects of the invention can be appreciated individually, collectively or in combination with each other.

Transactions may occur online, where data may be easily intercepted. For instance, information about a user during a first transaction may be recorded. The recorded information may be used in a subsequent transaction in a replay attack, to appear to be the same user that appeared in the first transaction, or permit the subsequent transaction to go through. The recorded information may pertain to conditions of the first transaction, such as a state of a device used in the first transaction.

In some embodiments, nonce data may be collected relating to a state of a device during the first transaction. The nonce data may include one or more sets of singularity values (e.g., nonce factors) that may realistically only occur once, and would not naturally be repeated. Thus, repetition of the nonce data may be cause for suspicion that a replay attack may be occurring. The nonce data may relate to an internal state of the device or component of the device, or may include data that may be collected relating to an environment of the device. The nonce data may include positional information, movement information, or any other information relating to the device.

Nonce data may be collected with aid of one or more sensors. The sensors may be on-board the device. The sensors may or may not require the use of external signals or data collected from outside the device.

Figure 1:
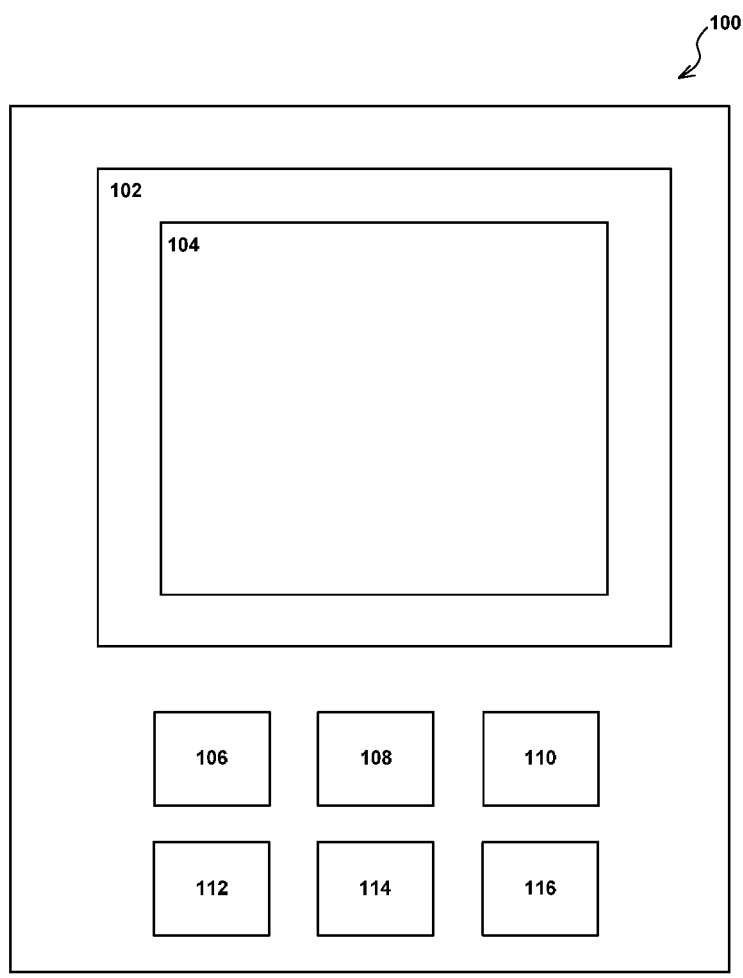
FIG. 1 shows an example of a device that may aid in conducting a transaction, in accordance with embodiments of the invention.

FIG. 1 shows an example of a device 100 that may aid in conducting a transaction, in accordance with embodiments of the invention. The device may be a user device that includes a display 102, and may include an interface 104 for performing a transaction using the device. The device may include one or more memory storage units 106, one or more processors 108, one or more communication units 110, one or more power source 112, and/or one or more sensors 114, 116.

The user device 100 may be an electronic device capable of aiding in a transaction or identifying and/or authenticating a user. The user device may be mobile device (e.g., smartphone, tablet, pager, personal digital assistant (PDA)), a computer (e.g., laptop computer, desktop computer, server, or any other type of device. The user device may optionally be portable. The user device may be handheld. The user device may be lightweight. In some embodiments, the user device may weigh 10, 8, 6, 5, 4, 3, 2, 1.5, 1, 0.7, 0.5, 0.3 0.1, 0.05, 0.01, 0.005, or 0.001 kg or less.

The user device may be a network device capable of connecting a network, such as a local area network (LAN), wide area network (WAN) such as the Internet, a telecommunications network, a data network, or any other type of network. The user device may be capable of direct or indirect wireless communications. The user device may be capable of peer-to-peer (P2P) communications and/or communications with cloud-based infrastructure.

The user device may be used during transactions (such as financial transactions) with a transaction entity. Transactions may include the exchange of finances (e.g., money, notes, debt, loans, etc.). The transactions may include the exchange of goods or services. The transactions may include the exchange of information. In some instances, the transactions may include the exchange of data that is sensitive and/or is not publicly available. A transaction entity may include any entity involved in a transaction. A transaction entity may be an individual, company, partnership, corporation, organization, group, host, or any other type of entity. In some examples transaction entities may include financial institutions (e.g., banks, financial management companies), merchants (e.g., stores, online merchants), social networking companies, non-profit organizations, health care organizations, educational institutions, governmental bodies or agencies, or any other type of entity. The user device may be capable of communicating directly or indirectly with a transaction entity. In some embodiments, the transaction entities may use or be a server or other type of online host. The user device may communicate with the server and/or other host device of the transaction entities.

The user device may include a display 102. The display may be able to present information to a user. The display may visually illustrate information. The information shown on the display may be changeable. The display may include a screen, such as a liquid crystal display (LCD) screen, light-emitting diode (LED) screen, organic light-emitting diode (OLED) screen, plasma screen, electronic ink (e-ink) screen, touchscreen, or any other type of screen or display. The display may or may not accept user input.

The display may show showing a graphical user interface 104. The graphical user interface may be part of a browser, software, or application that may aid in the user performing a transaction using the device. The interface may allow the user to self-identify using the device. The user may access a user account using the device. The user account may be used during a transaction. The user device may be capable of operating one or more software applications. One or more applications may or may not be related to an electronic transaction. One or more applications may require or use user identification and/or authentication.

The user device may be capable of accepting inputs via a user interactive device. Examples of such user interactive devices may include a keyboard, button, mouse, touchscreen, touchpad, joystick, trackball, camera, microphone, motion sensor, heat sensor, inertial sensor, or any other type of user interactive device.

The user device may comprise one or more memory storage units 106 which may comprise non-transitory computer readable medium comprising code, logic, or instructions for performing one or more steps. The user device may comprise one or more processors 108 capable of executing one or more steps, for instance in accordance with the non-transitory computer readable media. The one or more memory storage units may store one or more software applications or commands relating to the software applications. The one or more processors may, individually or collectively, execute steps of the software application.

A communication unit 110 may be provided on-board the device. The communication unit may allow the user device to communicate with an external device. The external device may be a device of a transaction entity, server, or may be a cloud-based infrastructure. The communications may include communications over a network or a direct communication. The communication unit may permit wireless or wired communications. Examples of wireless communications may include, but are not limited to WiFi, 3G, 4G, LTE, radiofrequency, Bluetooth, infrared, or any other type of communications. The communications unit may or may not aid in collecting data used for determination of nonce data.

The device may have an on-board power source 112. Alternative, an external power source may provide power to power the user device. An external power source may provide power to the user device via a wired or wireless connection. An on-board power source may power an entirety of the user device, or one or more individual components of the wireless device. In some embodiments, multiple on-board power sources may be provided that may power different components of the device. For instance, one or more sensor of the device may be powered using a separate source from one or more memory storage unit, processors, communication unit, and/or display of the device.

The user device may have one or more sensors 114, 116 on-board the device. A sensor may detect a state of a device. A state of a device may include a state of one or more components of the device. For instance, a state of one or more components of a device may include a state of a display of a device (e.g., an image or data shown on a display of a device, such as a screenshot), a level of the power supply (e.g., state of charge, percentage of charge remaining), usage of a device (e.g., software applications that are on and running), a time indicated by a clock of the device, the amount of the memory storage used by the device (e.g., number of bytes or percentage of memory used), a processing level of the device, operational states of one or more sensors of the device, a temperature of the device or any component of the device, or a barometric pressure of the device.

A state of the device may include positional information relating to the device. For instance, positional information may include spatial location of the device (e.g., geo-location). In some embodiments, positional information may include a latitude, longitude, and/or altitude of the device. In some embodiments, the positional information may be expressed as coordinates. The positional information may include an orientation of the device. For instance, the positional information may include an orientation of the device with respect to one, two, or three axes (e.g., a yaw axis, pitch axis, and/or roll axis). The positional information may be an attitude of the device. The positional information may be determined relative to an inertial reference frame (e.g., environment, Earth, gravity), and/or a local reference frame.

The positional information may include movement information of the device. For instance, the positional information may include linear speed of the device or linear acceleration of the device relative to one, two, or three axes. The positional information may include angular velocity or angular acceleration of the device about one, two, or three axes. The positional information may be collected with aid of one or more inertial sensors, such as accelerometers, gyroscopes, and/or magnetometers.

A state of the device may also include environmental information collected by the device. For instance, the device may include a camera that may take a snapshot of the environment around the device. The environmental information collected by the device may include an image of an environment within a field of view of a camera of the device. The environmental information may include audio information collected by a microphone of the device. The environmental information may include information collected by a motion detector, an ultrasonic sensor, lidar, temperature sensor, pressure sensor, or any other type of sensor that may collect environmental information about the device. The environmental information may include detecting the touch or hand position of a user holding the device, and collecting which portions of the device or touched or held by the user.

The one or more sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones), time sensors (e.g., clocks), temperature sensors, sensors capable of detecting memory usage and/or processor usage, or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy).

Any number of sensors may be provided on-board the device. The sensors may include different types of sensors, or the same types of sensors. The sensors and/or any other components described herein may be enclosed within a housing of the device, embedded in the housing of the device, or on an external portion of the housing of the device. The housing may or may not form a fluid-tight (e.g., water-tight or airtight) seal separating the interior of the housing and/or the exterior of the housing.

The one or more sensors may collect information continuously in real-time, or may be collecting information on a periodic basis. In some embodiments, the sensors may collect information at regular time intervals, or at irregular time intervals. The sensors may collect information at a high frequency (e.g., every minute or more frequently, every 10 seconds or more frequently, every second or more frequently, every 0.5 seconds or more frequently, every 0.1 seconds or more frequently, every 0.05 seconds or more frequently, every 0.01 seconds or more frequently, every 0.005 seconds or more frequently, every 0.001 seconds or more frequently, every 0.0005 seconds or more frequently, or every 0.0001 seconds or more frequently). The sensors may collect information according to a regular or irregular schedule.

The sensors may collect information in response to a detected event. In some embodiments, the sensors may collect information when a transaction is being initiated, completed, or at any state in-between. The sensors may collect information when the user is being authenticated. For instance, the sensors may collect information when the user is logging in. The sensors may collect information when the user is trying to access a user account. The sensors may collect information when the user makes a request to complete a transaction. The sensors may collect information when the user requests to receive or send money.

The sensors may collect information at a single point in time or multiple points in time. In some embodiments, the sensors may collect information over a time interval (e.g., on a periodic basis, continuously, etc.). In some embodiments, the time interval may be less than or equal to 10 seconds, 5 seconds, 3 seconds, 2 seconds, 1 second, 0.5 seconds, 0.3 seconds, 0.1 seconds, 0.05 seconds, 0.01 seconds, 0.005 seconds, 0.001 seconds, 0.0005 seconds, or 0.0001 seconds. Alternatively, the time interval may be greater than or equal to any of the values described herein, or may fall within a range between any two of the values described herein.

The information from the sensors may be stored as nonce data. In some embodiments, information from a single sensor may be stored as nonce data. Alternatively, information from multiple sensors may be stored as nonce data. The nonce data may include sensor information collected at a single point in time, or over a time interval. The nonce data may include raw sensor information, or may include sensor information that has been processed. The nonce data may be generated based on the sensor information. In some embodiments, the nonce data may be derived from, or a hash of the sensor information. The nonce data may be derived from at least some sensor information that should not be repeated realistically. For instance, the position (e.g., orientation) of the device is unlikely to repeat exactly at a high level of specificity. Audio data collected by the device is also unlikely to repeat exactly at a high level of specificity due to the many variables in the environmental conditions. The nonce data should not be repeated realistically. The nonce data would realistically only occur at a single time. The nonce data may represent a singularity value that can very likely only be generated or used once. Thus, any repetition of nonce data may be a signal that a replay attack may be occurring.

The nonce data may be generated at the same frequency at which sensor data is collected. Alternatively, the nonce data may be generated less frequently than the sensor data is collected. In one example, the sensor data may collect information continuously or at a high frequency, while the nonce data may be generated and/or stored in response to a detected event. In some embodiments, all of the collected sensor data may be used to generate nonce data. Alternatively, not all of the collected sensor data may be used to generate the nonce data.

The nonce data may be generated on-board the device. For instance, the nonce data may be generated using one or more processors of the device. The nonce data may be stored in one or more memory storage units of the device. The nonce data may be transmitted with aid of the communication unit, to an external device or network. Alternatively, the nonce data may be generated off-board the device. Data from one or more sensors may be transmitted, with aid of the communication unit, to an external device or network. The data from the sensors may or may not be pre-processed before being transmitted. The data from the sensors may or may not be stored in memory before being transmitted. The data from the sensors may be used at an external device or network to generate nonce data.

Figure 2:
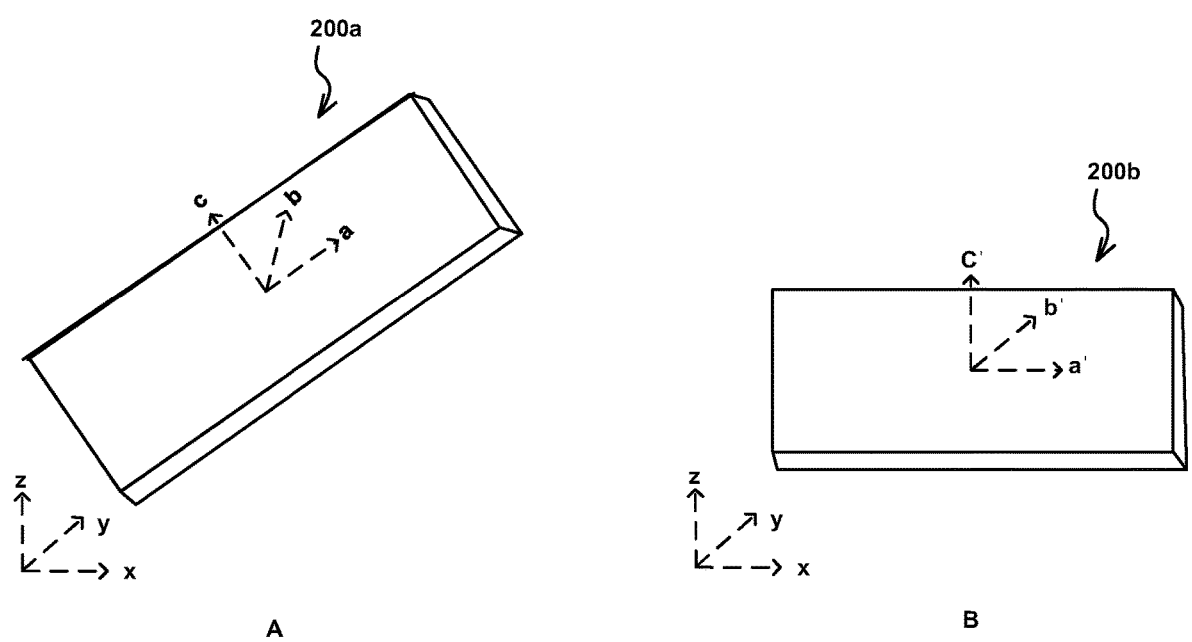
FIG. 2 shows an example of positional data about a device that may be collected and used as nonce data, in accordance with embodiments of the invention.

FIG. 2 shows an example of positional data about a user device that may be collected and used as nonce data, in accordance with embodiments of the invention.

Positional information about a user device may be collected with aid of one or more sensors. In some embodiments, the positional information may include an orientation of the user device. The orientation may be provided with respect to a static reference frame, such as an environment. The orientation may be provided with respect to a direction of gravity, and/or magnetic poles. The orientation may be determined with aid of one or more inertial sensors on the user device. Examples of inertial sensors may include, but are not limited to, accelerometers, gyroscopes, magnetometers, or any combination thereof. In some instances, a chip may be provided that may integrate one or more inertial sensors. One or more of the inertial sensors may include piezoelectric components. An inertial sensor may detect orientation with aid of a force of gravity, magnetic fields, and/or moment of inertia. The sensors and/or chips may be provided within a housing of the user device. The orientation of the user device may be determined about a single axis, two axes, or three axes. The axes may be orthogonal to one another. The axes may correspond to pitch, roll, and yaw axes of the user device. A single inertial sensor may be able to detect orientation with respect to any or all of the axes simultaneously, or multiple inertial sensors may be provided, each corresponding to an axis.

The orientation of the user device may be determined to a high degree of accuracy and/or precision. In some instances, an orientation of the user device may be determined to within less than or equal to about 10 degrees, 5 degrees, 3 degrees, 2 degrees, 1 degree, 0.1 degrees, 0.01 degrees, 0.001 degrees, 0.0001 degrees, 0.00001 degrees, or less. The orientation may be determined with respect to each of the axes, such as each of the yaw, pitch, and roll axes of the user device. The orientation may include an azimuth of the device. The orientation may include a directional vector representing the orientation of the device relative to one, two or three axes.

Any description herein of orientation information may include static orientation information and/or dynamic orientation information. For instance, any reference to orientation information may include orientation movement information, such as angular velocity and/or angular acceleration. The angular movement information may be determined about a single axis, two axes, or three axes. The axes may be orthogonal to one another. The axes may correspond to pitch, roll, and yaw axes of the user device. A single inertial sensor may be able to detect orientation movement with respect to any or all of the axes simultaneously, or multiple inertial sensors may be provided, each corresponding to an axis. Angular velocity of the user device may be determined to a high degree of accuracy and/or precision. In some instances, an angular velocity of the user device may be determined to within less than or equal to about 10 degrees/s, 5 degrees/s, 3 degrees/s, 2 degrees/s, 1 degree/s, 0.1 degrees/s, 0.01 degrees/s, 0.001 degrees/s, 0.0001 degrees/s, 0.00001 degrees/s, 0.000001 degrees/s, or less. Angular acceleration of the user device may be determined to a high degree of accuracy and/or precision. In some instances, an angular acceleration of the user device may be determined to within less than or equal to about 10 degrees/s$^2$, 5 degrees/s$^2$, 3 degrees/s$^2$, 2 degrees/s$^2$, 1 degree/s$^2$, 0.1 degrees/s$^2$, 0.01 degrees/s$^2$, 0.001 degrees/s$^2$, 0.0001 degrees/s$^2$, 0.00001 degrees/s$^2$, 0.000001 degrees/s$^2$, or less. The orientation movement may be determined with respect to each of the axes, such as each of the yaw, pitch, and roll axes of the user device.

Positional information may or may not include spatial location information about the user device. For instance, coordinates relating to a spatial location of the user device may be determined. The spatial location may be provided with respect to a static reference frame, such as an environment. The direction of gravity and/or magnetic poles may be utilized as a reference in the static reference frame. The spatial location may be determined with aid of one or more inertial sensors, global positioning system (GPS) systems, vision sensors, reference sensors, or any combination thereof. Examples of inertial sensors may include, but are not limited to, accelerometers, gyroscopes, magnetometers, or any combination thereof. In some instances, a chip may be provided that may integrate one or more inertial sensors. One or more of the inertial sensors may include piezoelectric components. An inertial sensor may detect spatial location with aid of a force of gravity, magnetic fields, and/or moment of inertia. The sensors and/or chips may be provided within a housing of the user device. The spatial location of the user device may be determined along a single axis, two axes, or three axes. The axes may be orthogonal to one another. The axes may correspond to pitch, roll, and yaw axes of the user device. A single inertial sensor or other type of sensor may be able to detect spatial location with respect to any or all of the axes simultaneously, or multiple sensors may be provided, each corresponding to an axis.

A spatial location of a user device may be determined to a high degree of accuracy and/or precision. In some instances, the spatial location of the user device may be determined to within less than or equal to about 20 cm, 10 cm, 5 cm, 3 cm, 2 cm, 1 cm, 1 mm, 0.1 mm, 0.01 mm, 0.001 mm, 0.0001 mm, 0.00001 mm, or less. The spatial location may be determined along each of the axes, such as each of the yaw, pitch, and roll axes of the user device.

Any description herein of spatial location information may include static spatial location information and/or dynamic spatial location information. For instance, any reference to spatial location information may include spatial movement information, such as linear velocity and/or linear acceleration. The spatial movement information may be determined along a single axis, two axes, or three axes. The axes may be orthogonal to one another. The axes may correspond to pitch, roll, and yaw axes of the user device. A sensor may be able to detect orientation movement with respect to any or all of the axes simultaneously, or multiple sensors may be provided, each corresponding to an axis. Linear velocity of the user device may be determined to a high degree of accuracy and/or precision. In some instances, an linear velocity of the user device may be determined to within less than or equal to about 20 cm/s, 10 cm/s, 5 cm/s, 3 cm/s, 2 cm/s, 1 cm/s, 1 mm/s, 0.1 mm/s, 0.01 mm/s, 0.001 mm/s, 0.0001 mm/s, 0.00001 mm/s, 0.000001 mm/s, 0.0000001 mm/s, or less. Linear acceleration of the user device may be determined to a high degree of accuracy and/or precision. In some instances, an linear acceleration of the user device may be determined to within less than or equal to about 20 cm/s$^2$, 10 cm/s$^2$, 5 cm/s$^2$, 3 cm/s$^2$, 2 cm/s$^2$, 1 cm/s$^2$, 1 mm/s$^2$, 0.1 mm/s$^2$, 0.01 mm/s$^2$, 0.001 mm/s$^2$, 0.0001 mm/s$^2$, 0.00001 mm/s$^2$, 0.000001 mm/s$^2$, 0.0000001 mm/s$^2$, or less. The spatial movement may be determined with respect to each of the axes, such as each of the yaw, pitch, and roll axes of the user device.

Position information may include considering orientation only, spatial location only, or both orientation and spatial location (which may include static and/or dynamic information). Sensors that may aid in detection of the position information may be provided on a user device or a device external to the user device. In some instances, when a rigid connection is formed between the user device and the external device, a sensor on the external device may aid in detecting position information of the user device, or vice versa. In some instances, only position of a user device may be considered, only position of the external device may be considered, or both a position of the user device and the external device may be considered.

The position information may be collected at a detected event. The position information may be collected at any authentication event. An authentication event may be at any of the times previously mentioned, which may include but are not limited to, a user logging into an account, a user performing any identification verification, a user providing financial verification, a user initiating a transaction, a user requesting completion of a transaction, completion of a transaction, at any point while a user is accessing a user account, at any point while the user is interacting with a transaction entity, or at any point while the user is engaged in a transaction. An authentication event may include any attempt by a user to self-identify and/or authenticate the identity of the user. This may occur during a transaction. An authentication event may include a transaction itself. An authentication event may include any time nonce data is collected and/or generated. An authentication event may be initiated by a user, a user device (e.g., application running on the user device), transaction entity, authentication entity, or any other entity. Any other type of detected event may cause the position information to be collected. Any description herein of the collection of the position information may also be applied to generation of nonce data that may include or be based on the position information.

The position information may be collected at a single instance, or at multiple instances (e.g., every few minutes, seconds, milliseconds) or over a range of time (e.g., during an entirety of a user authentication process, transaction, or access to a user's account). The timing of the collection of the position information may be determined to a high degree of accuracy and/or precision. In some instances, the timing information may be determined to within less than or equal to about 1 minute, 30 seconds, 10 seconds, 3 seconds, 2 seconds, 1 second, 0.1 seconds, 0.01 seconds, 0.001 seconds, 0.0001 seconds, 0.00001 seconds, 0.000001 seconds or less. In some instances, when position information is collected at multiple points in time (e.g., over a time range), a position profile may be created and/or stored. For instance, the position of the user device at a first time t1, the position of a user device at a second time t2, the position of a user device at a third time t3, and so forth may be stored as a set of data or multiple sets of data. For example, a set of positional data may appear as follows: [0.00000, (0.00000, 0.00000, 0.00000)), 0.00001, (0.00120, 0.00054, −0.03012), 0.00002, (0.00278, 0.00106, −0.05045), 0.00003, (0.00415, 0.00198, −0.08398), . . . ], where the time values may be provided near positional data (angular orientation data about a pitch, yaw, and roll axis, or spatial translation data with respect to a pitch, yaw, or roll axis). The position information and/or associated timing may be stored in conjunction with authentication information or may be stored separately. The position information may have a pre-defined format or a pre-defined range.

If exact positional data (e.g., at a single point in time, or a positional profile collected over multiple points in time) is repeated for another transaction or authentication event, this may be considered suspicious, particularly when positional data is collected to a high degree of precision and/or accuracy. Similarly, if during a duration of an authentication event, a positional profile does not have any changing positions over time, this may also be suspicious or warrant further review since even if the user device is substantially stationary, it is likely to be exposed to some vibration or slight movement that may be detected by sensitive sensors.

In some embodiments, if the positional data is detected to be not in a pre-defined format or pre-defined range, it may be considered suspicious that the data is changed maliciously by a fraudster. For instance, the orientation data should be in the range (in a four digits format) from 0000 to 3600, if the number corresponding to the orientation data is detected to be out of the range such as 3800, it may indicative of a fraud.

The position of a device may change over time. The position of a device may change between different transactions or accesses to a user account. The position of a device may change between authentication events. In some instances, the orientation and/or spatial location of the device may change over time. Tables 1-3 below show samples of position information of a device that may be collected, which are provided by way of example only and are not limiting. Any combinations of orientation and spatial location information, static and dynamic information, and/or single point or multiple points in time collection of information may be provided.

TABLE 1

Static orientation of device about three axes collected at single point in time per authentication event.

| Event # | Time | Static orientation (pitch, yaw, roll) |
|---|---|---|
| 1 | Jan. 1, 2015 12:23:44.12345 | (−14.673672, 78.341264, 34.256532) |
| 2 | Jan. 14, 2015 06:11:54.85342 | (−73.672435, −6.375891, 11.234598) |
| 3 | Feb. 2, 2015 16:55:31.53256 | (22.478256, 54.768463, 2.475681) |
| 4 | Feb. 4, 2015 10:05:04.12765 | (7.476859, 38.975632, −82.115748) |
| 5 | Feb. 4, 2015 23:19:33.93643 | (44.585969, −15.465722, 21.333563) |

TABLE 2

Static and dynamic spatial location of device with respect to three axes collected at single point in time per authentication event.

| Event # | Time | Static location; linear velocity (pitch, yaw, roll) |
|---|---|---|
| 1 | Jan. 5, 2015 12:23:44.12345 | (−14.673672, 78.341264, 34.256532; 0.032142, 3.276532, 7.345677) |
| 2 | Jan.16, 2015 06:11:54.85342 | (−73.672435, −6.375891, 11.234598; 10.323452, 0.343214, 02.314253) |
| 3 | Feb. 1, 2015 16:55:31.53256 | (22.478256, 54.768463, 2.475681; 5.543856, 1.111135, 0.000234) |
| 4 | Feb. 4, 2015 10:05:04.12765 | (7.476859, 38.975632, −82.115748; 18.123123, 2.978675, 5.236543) |
| 5 | Feb. 4, 2015 23:19:33.93643 | (44.585969, −15.465722, 21.333563; 4.576874, 9.436875, −1.564765) |

TABLE 3

Static orientation and static spatial location of device with respect to three axes collected at multiple points in time per authentication event.

| Event # | Time | Static orientation; static spatial location (pitch, yaw, roll) |
|---|---|---|
| 1 | 12:23:44.12345 | (−14.673672, 78.341264, 34.256532; 0.032142, 3.276532, 7.345677) |
| 1 | 12:23:44.12346 | (−14.672456, 78.546453, 34.256325; 0.067467, 3.315674, 7.125326) |
| 1 | 12:23:44.12347 | (−14.670576, 78.809654, 34.255976; 0.091235, 3.397543, 6.945435) |
| 2 | 10:05:04.12760 | (7.476859, 38.975632, −82.115748; 18.123123, 2.978675, 5.236543) |

TABLE 3-continued

Static orientation and static spatial location of
device with respect to three axes collected at multiple
points in time per authentication event.

| Event # | Time | Static orientation; static spatial location (pitch, yaw, roll) |
|---|---|---|
| 2 | 10:05:04.12761 | (8.132435, 38.005342, −81.111134; 18.234234, 2.224354, 6.343553) |
| 2 | 10:05:04.12762 | (8.886454, 37.435325, −80.543763; 18.445356, 1.334532, 7.654321) |

One or more sensors may be provided that may aid in collecting positional information about the device. As shown in Scenario A, a device 200*a* may be provided at a first position, while in Scenario B, a device 200*b* may be provided at a second position different from the first position. For instance, the devices may be at different orientations over time. For instance, with respect to a static reference frame (e.g., illustrated by the x-, y-, and z-axes), the devices may have different orientation (e.g., illustrated by the a-, b-, and c-axes in Scenario A, and the a'-, b'-, and c'-axes in Scenario B). The angles between the axes may change over time. As previously described, the position information (e.g., angle information, spatial location information) may be determined to a high degree of accuracy and/or precision. An orientation of the device may be assessed over a single axis, two axes, or three axes. A spatial location of the device may be assessed along a single axis, two axes, or three axes.

Authentication events may occur at different points in time. A user may provide authentication and/or participate in a transaction at different points in time. While it is possible that the device may have a similar position between different authentication events, it is highly unlikely that they will have a completely identical position, particularly when the position is measured to a high degree of accuracy and/or precision. At least some minor variation may be expected in the orientation and/or spatial location of the device between authentication events. Thus, if positions taken at different authentication events are completely identical particularly at a high degree of accuracy and/or precision, it may be likely that a replay attack is occurring. For instance, a fraudster may have previously recorded an authentication event (e.g., previous transaction, user authentication, account access), including the positional information, and is replaying the previous authentication event. In one example, during a first authentication event, the orientation of the device may be read as [12.56736 degrees, 5.23957 degrees, and 0.31984 degrees]. If during a second authentication event, the orientation of the device is read to be exactly the same, [12.56736 degrees, 5.23957 degrees, and 0.31984 degrees], this may be highly improbable and indicative of a replay attack. The same may be said when the spatial location is identical to a high degree of precision between authentication events. Particularly when the device is a mobile device or handheld device, the positional information is likely to change. Even if the device is resting on a surface during an authentication event, user interaction with the device is likely to cause some vibration or movement to the device. For instance, touching a touchscreen, typing on keys, moving a mouse, or any other type of interaction with the device is likely to cause some movement of the device. Even if the user does not directly touch the device, environmental conditions may cause some vibration or movement of the device detectable by sensors of the device.

In some embodiments, the positional data is also checked to see if it is conforms to a pre-defined format or pre-defined range. When the positional data is detected to be outside the pre-defined range, it may be indicative that the data is changed maliciously by a fraudster. For instance, the orientation data should be in the range (in a four digits format) from 0000 to 3600, if the number corresponding to the orientation data is detected to be out of the range such as 3800, it may indicative of a fraud.

Optionally position of the device in relation to time may be assessed. For example, if a first position is recorded at a first time, and a second position is recorded at a second time, the change in positions in relation to the change in times may be assessed. For example, a velocity of change may be assessed by determining a difference between the second position and the first position (e.g., second position minus first position) divided by a difference between the second time and the first time (e.g., second time minus first time). If the velocity is higher than the device could have reasonably traversed the positions, then a red flag may be issued. For example, if the device is determined to be in California during a first authentication event, and in New York during a second authentication event 5 minutes later, then it may be determined that the device could not traverse between those locations in the given amount of time and a possible indication of fraud may be provided. Such readings may be made based on sensors on the user device as previously described.

Thus, an authentication event, such as a user authentication process or transaction, may be assessed for likelihood of tampering or fraud. An identity of a user may be verified and/or a transaction may be authenticated when the positional information does not provide an increased likelihood of fraud.

Figure 3:
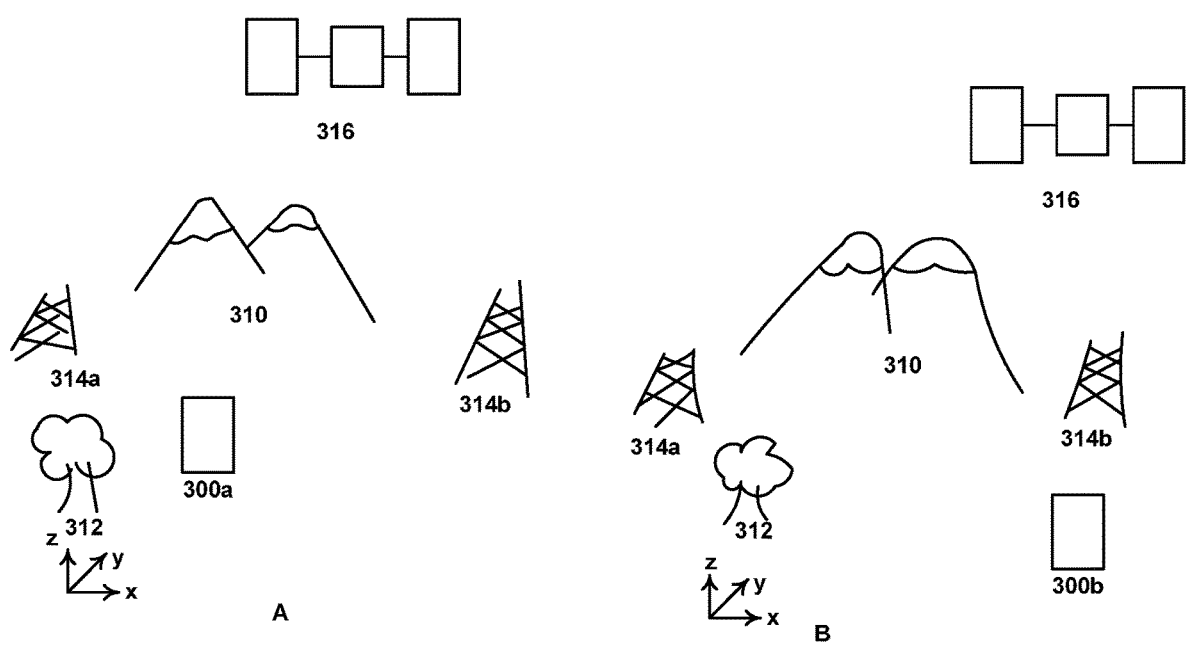
FIG. 3 shows an example of geo-location data about a device that may be collected and used as nonce data, in accordance with embodiments of the invention.

FIG. 3 shows an example of geo-location data about a device that may be collected and used as nonce data, in accordance with embodiments of the invention.

As previously described, positional information about a user device may be collected with aid of one or more sensors. The positional information may include spatial location information. The location of a device within an environment may be assessed.

Scenario A shows a location of a device 300*a* within an environment. Scenario B shows the device 300*b* at a different location within an environment. The environment may include one or more landmark features 310, 312. The change in location of the device within the environment may be determined with aid of one or more sensors of the device, such as the sensors described elsewhere herein. In one example, geo-location sensors, such as GPS, may be used to detect the location of the device. Spatial coordinates, such as latitude, longitude, and/or altitude may be determined for the device. In some embodiments, spatial coordinates may be assessed with a high level of specificity. For instance, the spatial coordinates may be determined with accuracy and/or precision of less than or equal to 1 m, 50 cm, 20 cm, 10 cm, 5 cm, 3 cm, 1 cm, 5 mm, 1 mm, 0.5 mm, 0.1 mm, 0.05 mm, 0.01 mm, 0.005 mm, 0.001 mm, 0.0001 mm, 0.00001 mm, or 0.000001 mm.

In another example, the change in location of the device may be determined with aid of one or more cameras onboard the device. The cameras may capture an image of the environment around the device and compare images to detect that there is some change. For example, in Scenario A, the position of the mountain 310 and the tree 312 may change relative to Scenario B. Other sensors may be utilized to detect a change within the environment, which may indicate that the device has likely moved and/or is not likely to be participating in a replay attack. The environment may be a static reference frame, as indicated by the x-, y-, and z-axes. The landmark features may or may not be static relative to the static reference frame.

The change in location of the device may also be determined with aid of one or more communication devices 314*a*, 314*b*, 316. For instance, a device may communicate with a communication tower (e.g., telecommunication tower, cell tower). Any description of a communication tower may also be applied to a WiFi hotspot or wireless router. Based on which communication tower the device is communicating with, the location of the device may be detected to change. For instance, in Scenario A, the device 300*a* may be communicating with a first communication tower 314*a* while in Scenario B, the device 300*b* may be communicating with a second communication tower. Based on the identity of the tower, the device may be determined to have changed spatial locations or not. Distance to the tower and/or signal strength may also be used to assess a change in location. Similarly, a device may communicate with a satellite 316 and/or be detected by one or more satellites. The identity of the satellite may be used, similar to a communication tower, to assess a change in spatial location of the device. In some embodiments, the satellites may be moving, so information about the movements of the satellites may be incorporated into assessing the location of the device. Information collected about the device by the one or more satellites may be used to determine whether the device has moved. The satellite may detect a geo-location position of the device.

As previously described, the spatial location of the device may be ascertained to a high level of precision and/or accuracy. Alternatively, the spatial location of the device may be ascertained to a lower level of precision and/or accuracy (e.g., on the order of meters, tens of meters, hundreds of meters, thousands of meters), but may be used as a check in detecting a replay attack. For instance, if a change in location is detected, even at a lower level of specificity, the likelihood of a replay attack may be determined to be low or non-existent.

As previously described, the spatial location information may be used to determine nonce data for the device. The spatial location information may be used in addition to nonce data for the device. The spatial location information may aid in the detection of a replay attack.

Figure 4:
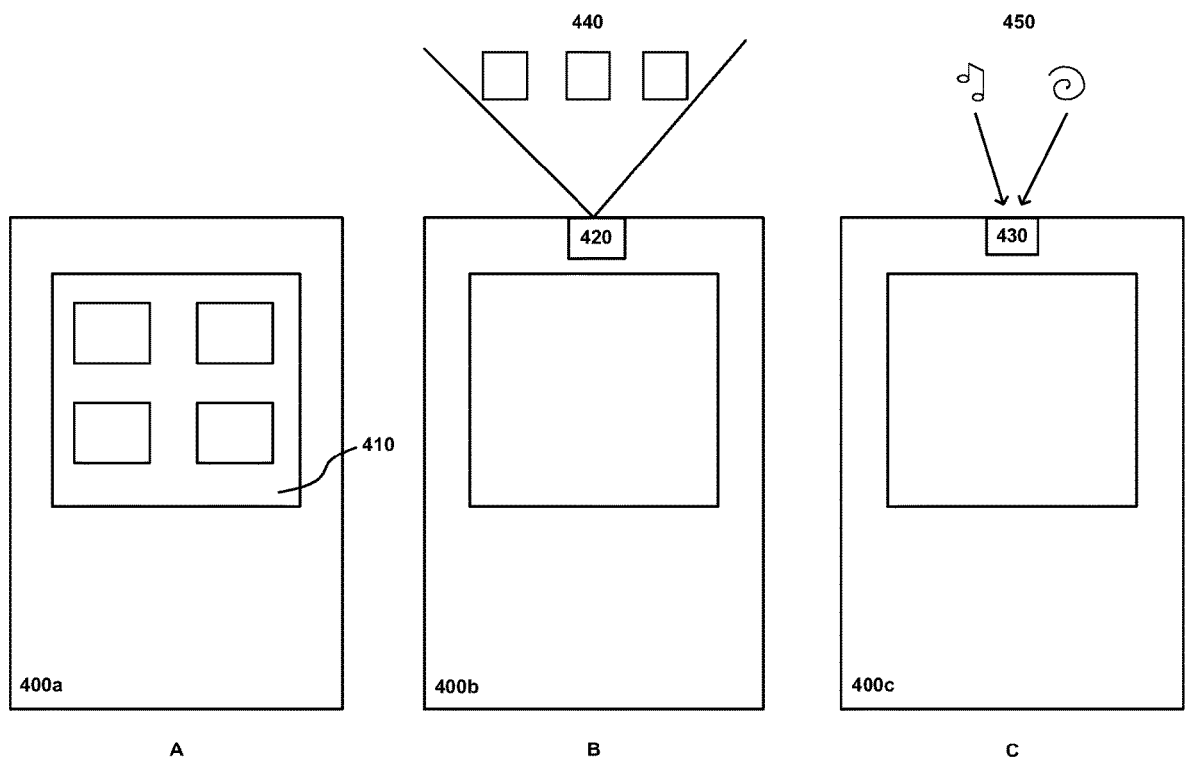
FIG. 4 shows examples of local and environmental data about a device that may be collected and used as nonce data, in accordance with embodiments of the invention.

FIG. 4 shows examples of local and environmental data about a device that may be collected and used as nonce data, in accordance with embodiments of the invention.

Scenario A shows a device 400*a* and an example of local data about the device that may be collected. Local data about the device may refer to a state of the device or device component. In some instances, local data may refer to a device or component state without regard to the environmental conditions around the device. Examples of components of the device may include a display, memory, processors, power supply, communication unit, sensors, housing, or any other component of the device. The local state of the device may include positional information, such as orientation of the device. The local data may be collected at a single point in time, multiple successive points in time, or over a time interval.

In one example, the local data about the device may refer to a state of the display 410 of the device. For instance, the local data may include whether the display is turned on or off. The local data may include an image shown on the display. For example, the local data may include a screenshot of an image on the display, or may include data about the image shown on the display. The local data may include screenshots of the display over a period of time (e.g., dynamic display). An analysis of light distribution and/or other data pertaining to the image may be collected. A determination of power consumed by the display at a moment in time may be collected. In some embodiments, it may be determined that a change in the state of the display may reduce the likelihood of a replay attack. If a change in the state of display is included as part of the nonce data or the nonce data is derived based on the state of display, the change in the state of the display may be reflected in the change of the nonce data. Similar applications to the nonce data may be applied for any other type of data collected about the device, including other local and/or environmental data as described elsewhere herein.

The local data about the device may refer to a state of a power supply of the device. For instance, the battery state of charge (e.g., remaining percentage of charge, remaining length of time of battery life, etc.) may be assessed. The battery state of charge may be determined to a high degree of precision and/or accuracy. For instance, a remaining percentage of charge left may be determined to within about 1%, 0.5%, 0.1%, 0.05%, 0.01%, 0.005%, 0.001%, 0.0001%, or 0.00001%. The local data may also include information about a battery depletion rate at a given moment in time. The battery depletion rate may also be determined to a high degree of accuracy and/or precision, such as any of the percentage values described per second, per millisecond, or any other unit of time. The local data may also include a temperature of the battery or any other measurement pertaining to the battery.

The local data may include temperature of any component of the device, or the device as a whole. The temperature may be determined to a high degree of accuracy and/or precision. For instance, the temperature may be determined to within 2, 1, 0.5, 0.1, 0.05, 0.01, 0.005, 0.001, 0.0005, 0.0001, 0.00005, or 0.00001 degrees C. The temperature of multiple components of the device may be determined. A temperature profile may be generated for multiple components of the device. It may be extremely unlikely that the exact same temperature for a component, or combination of multiple components may be collected during different authentication events. Temperature data may also include a rate of change of temperature at a moment in time for a single component or multiple components. A likelihood of a replay attack may be increased if the temperature and/or temperature profile is identical, and/or the likelihood of a replay may be decreased if the temperature and/or temperature profile is different.

Additionally, local data of the device may include information about usage of a communication unit of the device. For instance, the amount of data being transmitted out and/or received in may be collected. The information pertaining to the data content itself being transmitted out and/or received in may be collected. In another example, information about an identity or type of external device or network communicating with the communication unit may be collected. Such information about the communication unit may be taken at a single point in time or over a time interval. If the communication unit data is identical, there may be increased likelihood of a replay attack, or if the data is different, there may be a decreased likelihood of a replay attack.

Further local data of the device may include information about one or more memory storage units. For instance, the amount of memory stored and/or remaining may be determined. The amount of memory stored and/or remaining may be determined on the order of bytes, or may be determined as a percentage. The distribution of stored memory may also be determined. For instance, a level of fragmentation or how the fragmentation of data is stored or distributed may be determined. It may be unlikely for exact duplicates of amount of data storage or distribution of data storage to be repeated between authentication events. The content of the data stored in the memory storage units may or may not be considered in determining the local data. If memory storage related data is identical, there may be an increased likelihood of a replay attack, or if the data is different, there may be decreased likelihood of a replay attack.

In some embodiments, the local data of the device may include information about one or more processors of the device. For instance, the level of usage of the processors (e.g., as a numerical value, or as a percentage) may be determined. In some embodiments, data about software or applications running on the devices may be determined. The usage of processors relating to each of the software or applications may be determined. A processor usage profile may be created based on the usage of the various software, applications, and/or processes. Such data may be collected at a single point in time or over a time interval. If processor related data is identical, there may be an increased likelihood of a replay attack, or if the data is different, there may be decreased likelihood of a replay attack.

Collection of local data of the device may include data relating to one or more sensors of the device. Data collected by the sensors themselves may be used for local data. In some instances, operational parameters of the sensors (e.g., whether they are on or off, whether they are collecting data, frequency of data collection, direction of data collection, sensitivity of data collection, amount of data being collected, the data collected itself) may be assessed. In one example, if the sensor is a camera, the operational parameters of the camera, such as shooting mode, zoom information, exposure, focus, direction, light balancing, resolution, or any other information about the camera may be used as local data. Data relating to a single sensor or multiple sensors may be considered. For instance, a combination of sensors may be considered in determining a sensor usage profile. The data relating to the sensor may be collected at a single point in time or over a time interval. If sensor related data is identical, there may be an increased likelihood of a replay attack, or if the data is different, there may be decreased likelihood of a replay attack.

Scenario B shows a device 400b and an example of environmental data about the device that may be collected. Environmental data about the device may refer to data pertaining to the environment outside the device. In some instances, the environmental data may include collection of data of external conditions outside the device. Such data may be visual, thermal, audio, include data anywhere along the electromagnetic spectrum, include acoustic information, include The environmental data may be collected at a single point in time, multiple successive points in time, or over a time interval.

In one example, the environmental data about the device may refer to data collected by an image sensor 420 of the device. One or more image sensors of the device may be used to collect an image of an environment 440 outside the device. The image collected by the image sensor may include an image of one or more landmark features around a device and/or an image of the user of the device, or any combination thereof. The environmental data may include the image or images captured by one or more image sensors, or may include data about the image(s) captured by the one or more image sensors. The environmental data may include snapshots collected over a period of time (e.g., dynamic display). An analysis of light distribution and/or other data pertaining to the image(s) may be collected. For example, brightness distribution, color distribution, saturation, hue, or other data relating to the images may be collected and/or analyzed. Such data may be collected and/or reviewed on a pixel by pixel basis, or on a pixel group by pixel group (e.g., pixel row, pixel height) basis. In some embodiments, it may be determined that a change in the images captured may reduce the likelihood of a replay attack. Completely identical image data may be extremely unlikely, and may indicate a higher likelihood of a replay attack. If image data is included as part of the nonce data or the nonce data is derived based on the image data, a change in the image data may be reflected in the change of the nonce data. Similarly, identical image data may be reflected in no change of the nonce data, if there are no other nonce factors that may be changing. Similar applications to the nonce data may be applied for any other type of data collected about the device, including other local and/or environmental data as described elsewhere herein.

The image sensor may be a camera used to capture visual images around the device. Any other type of sensor may be used, such as an infra-red sensor that may be used to capture thermal images around the device. The image sensor may collect information anywhere along the electromagnetic spectrum, and may generate corresponding images accordingly.

In some embodiments, the image sensor may be capable of operation at a fairly high resolution. The image sensor may have a resolution of greater than or equal to about 100 µm, 50 µm, 10 µm, 5 µm, 2 µm, 1 µm, 0.5 µm, 0.1 µm, 0.05 µm, 0.01 µm, 0.005 µm, 0.001 µm, 0.0005 µm, or 0.0001 µm. The image sensor may be capable of collecting 4K or higher images.

In some embodiments, the sensor used to collect environmental data may include lidar, sonar, radar, ultrasonic sensors, motion sensors, or any other sensor that may generate a signal that may be reflected back to the sensor. Such sensors may be used to collect information about the environment, such as the presence and/or location of objects within the environment.

Scenario C shows a device 400c and another example of environmental data about the device that may be collected. In one example, one or more audio sensors 430 may be used to collect environmental information 450. The audio information may include sounds captured from the environment. This may include ambient noise, and/or noise generated by the device itself. The audio data may include an audio snapshot collected at a single point in time, or may include an audio clip collected over a period of time. The period of time may be less than or equal to about 10 seconds, 5 seconds, 3 seconds, 2 seconds, 1 second, 0.5 seconds, 0.1 seconds, 0.05 seconds, 0.01 seconds, 0.005 seconds, 0.001 seconds, 0.0005 seconds, 0.0001 seconds, 0.00005 seconds, 0.00001 seconds, 0.000005 seconds, or 0.000001 seconds. Alternatively, the period of time may be greater than or equal to any of the values described, or may fall within a range between any two of the values described.

An analysis of audio characteristics of the audio data may be collected or determined. For instance a fast Fourier transform (FFT) analysis or similar type of analysis may be performed on the audio data. In some embodiments, it may be determined that a change in the audio captured may reduce the likelihood of a replay attack. The raw audio data and/or an analysis of the raw audio data may be provided as the environmental data. An audio fingerprint may thus be generated. An audio fingerprint may be expected to be unique to a particular time at which it is collected. Completely identical audio data may be extremely unlikely, and may indicate a higher likelihood of a replay attack. If audio data is included as part of the nonce data or the nonce data is derived based on the audio data, a change in the audio data may be reflected in the change of the nonce data. Similarly, identical audio data may be reflected in no change of the nonce data, if there are no other nonce factors that may be changing. Similar applications to the nonce data may be applied for any other type of data collected about the device, including other local and/or environmental data as described elsewhere herein.

In some embodiments, one or more audio sensors may be used to collect information. An audio sensor may be a microphone. The microphone may collect information from a wide range of directions, or may be a directional or parabolic microphone which has a limited range of directions. The microphone may be a condenser microphone, dynamic microphone, ribbon microphone, carbon microphone, piezoelectric microphone, fiber optic microphone, laser microphone, liquid microphone, MEMs microphone, or any other type of microphone. The audio sensors may be capable of collecting audio data with a high degree of sensitivity. In some embodiments, the audio sensors can differentiate audio data on the order of less than or equal to 10 dB, 5 dB, 3 dB, 2 dB, 1 dB, 0.5 dB, 0.1 dB, 0.05 dB, 0.01 dB, 0.005 dB, 0.001 dB, 0.0005 dB, 0.0001 dB, 0.00005 dB, or 0.00001 dB. As previously described, it may be extremely unlikely that audio data will repeat exactly, particularly when collected with a high-sensitivity microphone. A 100% match in audio allegedly collected for different transactions may increase the likelihood that a replay attack has occurred.

Figure 5:
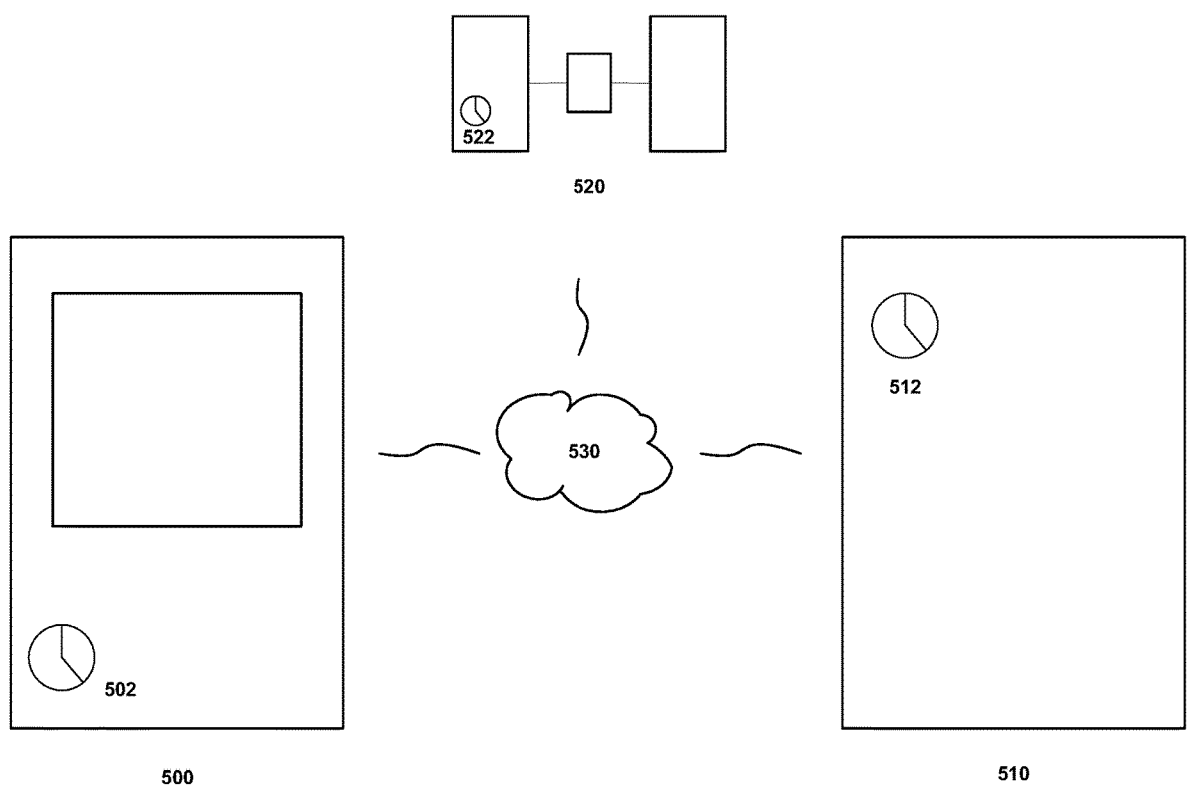
FIG. 5 shows time-based data about a device that may be collected and used as nonce data, in accordance with embodiments of the invention.

FIG. 5 shows time-based data about a device that may be collected and used as nonce data, in accordance with embodiments of the invention.

A user device 500 may be capable of communicating with one or more external devices 510, 520. In some examples, an external device may be a server 510, or any other type of device as described elsewhere herein. The external device may be a satellite 520 or any other type of communications device, such as a communication tower, WiFi or wireless router, as described elsewhere herein. The user device may optionally communicate with one or more external devices directly or over a network 530. The user device may optionally communicate with one or more external devices over a wired or wireless connection.

Time-based data may be collected. Time-based data may be collected from a local clock 502 of the user device 500. The time-based data may include a time of day and/or date. The time-based data may be determined to a high degree of accuracy and/or precision. For instance, the time-based data may have a degree specificity on the order of within 5 seconds, 1 second, 0.5 seconds, 0.1 seconds, 0.05 seconds, 0.01 seconds, 5 milliseconds, 1 millisecond, 0.5 milliseconds, 0.1 milliseconds, 0.05 milliseconds, 0.01 milliseconds, 0.005 milliseconds, 0.001 milliseconds, 0.0005 milliseconds, 0.0001 milliseconds, 0.00005 milliseconds, or 0.00001 milliseconds or less. The date may be specified to the year, month, and/or day of month. The time-based data may include day of the week, time-zone information, daylight savings related information, or any other time-related information. The clock may provide time and/or date information with precision and/or accuracy of an atomic clock. The time-based data may be used as nonce data and/or nonce data may be based on the time-based data. The time-based data may be collected at a single point in time or over a period of time.

The time-based data may be collected in response to an authentication event, or any other time. The time-based data itself may be used as an indicator of a likelihood of a replay attack. Since time is always changing, the time should not be repeating between authenticating events. If the time is identical, there may be an increased likelihood of a replay attack. If the time is not identical, there may be a reduced likelihood that a replay attack is occurring.

The time-based data may be collected in conjunction with information from other sensors of the device. The time-based data may be used to indicate time at which other data relating to a state of the device is being collected. For example, if the positional data about the device may be associated with the time-based data collected when the positional data is collected. The positional data may thus be associated with the time at which the positional data is collected. In another example, the audio data may be associated with time-based data collected when the audio data is collected. Collection of the time-based data and the data from the other sensors of the device may be synchronized. In some embodiments, the collection of the data may be synchronized by a signal from the local clock, from the one or more other sensors, or from a separate item that sends a synchronization signal to the lock and the one or more sensors to collect data.

The local clock of the user device may be synchronized with a world standard time. The local clock of the user device may be synchronized with one or more external clocks. For example, the local clock may be synchronized with a clock of an external device, such as a clock 512 of a server or a clock 522 of a satellite or other type of device. Alternatively, the local clock may operate independently of any external clock. This may result in the local clock having an offset from one or more external clocks. The offset may be a difference in time between an external clock (e.g., a worldwide standard clock, clock of an external device) and the local clock. The offset from one or more external clocks may or may not be known. The offset may or may not change over time. If the offset is known to change over time (e.g., perform clock drift), it may be an indicator of a replay attack if the recorded offset of the local clock does not change over time. Alternatively, if the offset of the local clock does change between authentication events, there may be a reduced likelihood of a replay attack.

Any description herein of a local clock being used to generate time-based data may also apply to one or more external clocks. For instance, instead of a local clock 502, an external clock on-board an external device, such as a server clock 512 and/or satellite clock 522 may be used to generate the time-based data. The external clock data may be received by the user device 500 and used. The external clock data may be pulled by the device, or may be pushed from the external device. The external clock data may be used and/or stored on-board the user device.

The time-based data based on the external clock data may include a time of day and/or date. Any time-based data characteristics as described elsewhere herein may apply to external clock data, as well as local clock data.

The time-based data may be collected in response to an authentication event, or any other time. For instance, when an authentication event is detected, data from an external clock may be collected or used by the user device. The device may send a request for the external clock data (e.g., pull the data) when the authentication event is detected. Alternatively, the external clock data may be sent down to the user device (e.g., push the data) without requiring a request from the user device. The time-based data from the external clock itself may be used as an indicator of a likelihood of a replay attack. Similarly, as previously described, the external clock data may be obtained in conjunction with information from other sensors of the device. The external clock time-based data may be used to indicate time at which other data relating to a state of the device is being collected.

The time from a single clock (e.g., local clock or external clock) may be used for generation of nonce data or any analysis of a potential replay attack. Alternatively, time from multiple clocks (e.g., multiple local clocks, multiple external clocks, or combinations of local and external clocks) may be used for generation of nonce data or analysis of a potential replay attack. For instance, time-based data from multiple clocks may be used to detect whether the time is showing up as the same identical time from an earlier authentication event, or whether there is some variation in any of the clocks from an earlier authentication event. In some embodiments, it may be suspicious if even one of the clocks show the exact same time. In some instances, it may be more suspicious if all of the clocks show the exact same time between authentication events. A likelihood of a replay attack may be determined based on the number of clocks with matching times and/or degree in the variation of the time.

Figure 6:
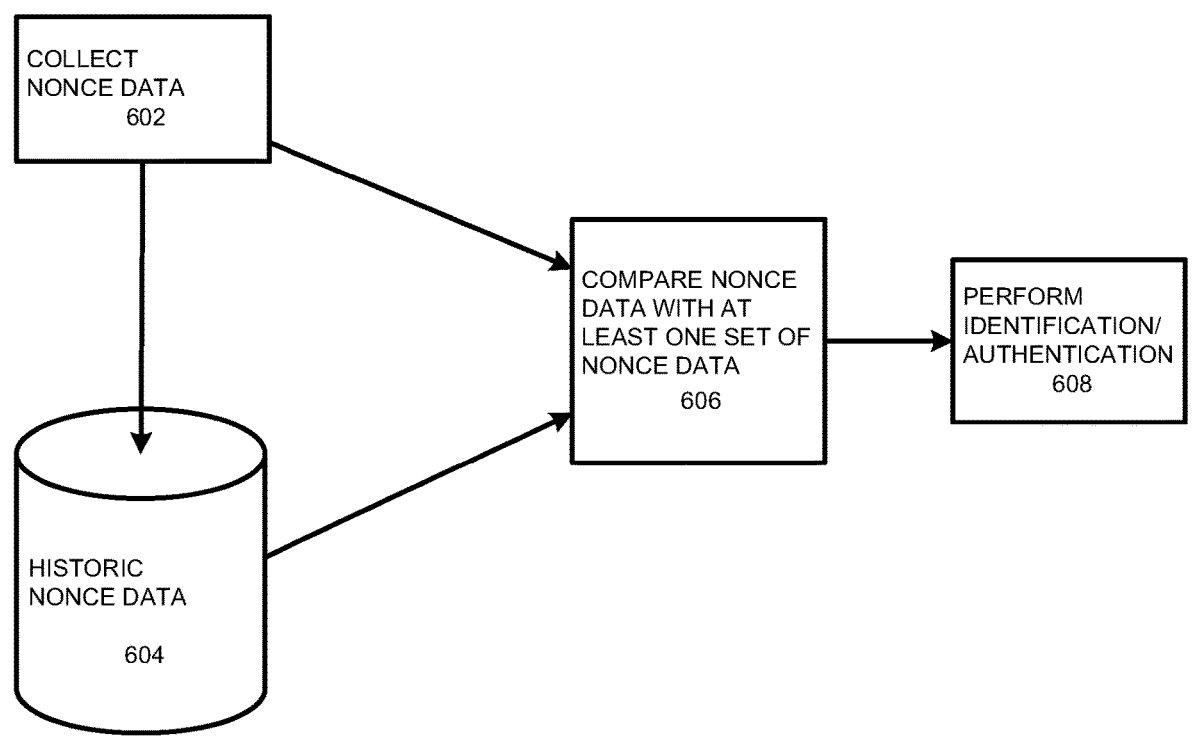
FIG. 6 shows an example of a using nonce data to identify users and/or devices, in accordance with embodiments of the invention.

FIG. 6 shows an example of a using nonce data to identify users and/or devices, in accordance with embodiments of the invention. A set of nonce data may be collected using a user device 602. The nonce data may be stored with historic nonce data 604. The nonce data may be compared with one or more previously collected sets of nonce data 606. An identification of the user based on the comparison may be assessed 608. In some embodiments, a transaction may or may not be permitted based on the comparison. Optionally, an indication of a likelihood of fraud, such as a replay attack, may be provided.

A set of nonce data may be collected during an authentication event 602. The nonce data may be collected continuously, or in response to a schedule. The nonce data may be collected in response to a detection of an authentication event. The nonce data may be collected with aid one or more sensors on a user device. The nonce data may be generated based on sensor data collected by one or more sensors on the user device. The nonce data may include or be derived from data about a state of the device. The nonce data may include or be derived from data about a local state or environmental state of the device. The nonce data may include positional information, time-based information, or any other type of information as described elsewhere herein. The nonce data may include or be derived from data that is not likely to repeat between authentication events. The nonce data may include data that is less than 2%, 1%, 0.5%, 0.1%, 0.05%, 0.01%, 0.005%, or 0.001% likely to repeat between authentication events. The nonce data may represent a singularity value that is not to be repeated. In some embodiments, if the nonce data were to be 100% identical, it would be indicative of a replay attack, or be extremely likely to be a replay attack.

The nonce data may reflect a state of the device at a single point in time or over multiple points in time. The nonce data may be substantially unique for that authentication event. Sensor data from a user device may optionally be communicated to a device external to the user device. The sensor data may be interpreted on-board the user device to generate a set of nonce data. Alternatively, the device external to the user device may generate the nonce data based on sensor data received. If an external device generates the nonce data, the nonce data may or may not be sent back to the user device.

Once a set of nonce data has been generated, it may be stored with historic nonce data 604. The historic nonce data may be stored in one or more memory units. The historic nonce data may be stored in a memory on-board the user device, on-board a device external to the user device (e.g., a separate device of any of the types described above), or distributed over multiple devices (e.g., peer-to-peer, cloud-computing based infrastructure, between the user device and an external device). In some embodiments, the nonce data may be generated on-board the user device and stored on-board the user device, an external device, or distributed over multiple devices. In other embodiments, the nonce data may be generated on-board an external device and may be stored on-board the external device, or the user device, or distributed over multiple devices. The one or more memory units may include databases. A single copy of the historic nonce data may be stored, or multiple copies may be stored. The multiple copies may be stored at different memory units. For instance, the multiple copies may be stored on difference devices (e.g., first copy on-board a user device, and second copy on-board an external device).

The historic nonce data may include data collected with aid of one or more sensors of a user device. The historic nonce data may include nonce data allegedly belonging to the same user and/or associated with the same device. For instance, if a current set of nonce data is collected for a first user, the historic positional data may include nonce data collected for the same user. This may include all nonce data for the same user (and/or device) collected using the same device. This may or may not include 'registration' nonce data. In some embodiments, a user may register a user's identity and/or a user device's identity by performing an initial authentication. A set of nonce information generated from the initial authentication may be stored as the registration nonce data. Alternatively, no particular registration nonce data is created. The various nonce data from all the authentication events for the user (and/or same device) may be stored. Alternatively, only the registration nonce data may be stored. Alternatively, only the most recent set of nonce data for a particular user (and/or user device) may be stored. In some instances, only the X most recent sets of nonce data for a particular user (and/or device) may be stored, where X is a predetermined number, e.g., X=1, 2, 3, 4, 5, 6, 7, 8, 9, 10 or more.

In some embodiments, the historic nonce data may include nonce data collected by the user device belonging to any user that has interacted with the user device. For instance, multiple users may have performed transactions or authentication events using the user device. The historic nonce data may include nonce data belonging to various users (and/or devices of the same user or different users), which may include the allegedly same user. For instance, if a current set of nonce data is collected for a first device, the historic nonce data may include sets of nonce data collected for the same user as well as other users. This may include all nonce data for the one or more users collected using the same device. This may or may not include 'registration' nonce data. In some embodiments, a user may register the user or a user's device by performing an initial authentication event. A set of nonce data generated from the initial authentication event may be stored as the registration nonce data for that user, or for that device of the user. Such registration may occur for multiple devices and/or multiple users. In some instances, each device may need to be registered the first time they are used for an authentication event. Alternatively, no particular registration nonce data is created. The various sets of nonce data from all the authentication events may be stored. Alternatively, only the registration nonce data may be stored per device or per user. Alternatively, only the most recent set of nonce data per device or per user may be stored. In some instances, only the X most recent sets of nonce data per device or per user may be stored, where X is a predetermined number, e.g., X=1, 2, 3, 4, 5, 6, 7, 8, 9, 10 or more.

As previously described the historic data may pertain to data collected using a particular user device. Alternatively, data from user devices may be shared and/or aggregated. The historic data may include data from multiple user devices. The historic data may include nonce data collected through multiple user devices. This may include the same user or multiple users performing authentication events at a single user device or over multiple user devices. The historic data may include data pertaining to all users that may be interacting with a user device or multiple user devices that may be providing information to the historic nonce data database. For example, an external device, such as a server or any other device described elsewhere herein, may receive nonce data from one or more user devices and store the historic nonce data.

After a set of nonce data has been collected, it may be compared with one or more previously collected sets of nonce data 606. This may include comparing the set of nonce data with historic nonce data. The set of nonce data may be compared with sets of nonce data that allegedly come from the same user (or same user device). For instance, when the set of nonce data is collected, additional information may be collected during the authentication event, which may include authentication/identification information. The additional information may include identifying information such as a user's name or other identifier, or may be used to access an account where the user's name or other identifier may be accessed. The additional information may be used to identify the allegedly same user. For example, if the additional information indicates the user is John Doe, the set of nonce data may be compared to other sets of nonce data that belong to John Doe. This may be compared to nonce data for all cards of John Doe, or only the same user device of John Doe as the one that is being used for the authentication event. If the collected nonce data identically match the previously stored nonce data, then there may be some suspicion raised whether the user is likely the same user that was previously identified as John Doe. An identical match may be highly unlikely to occur naturally and may be indicative of a replay attack.

The set of nonce data may be compared with any or all of the previously collected sets of nonce data that supposedly belong to the same user. This may be more specifically narrowed to the same device of the user, or may apply for any or all devices of the same user. For instance, if a registration set of nonce data is provided, the collected set of nonce data may be compared with the registration set of nonce data. The collected nonce data may be compared with the registration nonce data without being compared with any other nonce data, may be compared with the registration nonce data and other nonce data, or may be compared with other nonce data without being compared with the registration nonce data. In some instances, the nonce data may be compared with the most recently collected nonce data. The nonce data may be compared with a predetermined number of most recently collected nonce data, e.g., the two most recently collected sets of nonce data, the three most recently collected sets of nonce data, the four most recently collected sets of nonce data, the five most recently collected sets of nonce data, and so forth for any number of most recently collected nonce data.

The nonce data may be compared with nonce data that allegedly come from any user that has information stored at the historic nonce data. When the set of nonce data is collected, additional information may be collected during the authentication event, which may include data about the user and/or user device. As previously discussed, the additional information may include identifying information that may be used to identify the user. The additional information may be used to identify the allegedly same user. For example, if the additional information indicates or is used to find that the user is John Doe, the nonce data of the card may be compared to other nonce data that belong to John Doe as well as any other users that may have stored historic data. If the collected nonce data identically matches the previously stored nonce data, then it may raise a suspicion of a replay attack.

The set of nonce data may be compared with any or all of the previously collected sets of nonce data that supposedly belonging to any of the users participated in authentication events. For instance, if nonce data are provided for the various users, the nonce data may be compared with the registration nonce data of the various users. The nonce data may be compared with the registration nonce data without being compared with any other nonce data, may be compared with the registration nonce data and other nonce data, or may be compared with other nonce data without being compared with the registration nonce data. In some instances, the nonce data may be compared with the most recently collected nonce data for each of the users or devices of the users. The nonce data may be compared with a predetermined number of most recently collected nonce data, e.g., the two most recently collected sets nonce data, the three most recently collected sets of nonce data, the four most recently collected sets of nonce data, the five most recently collected sets of nonce data, and so forth for any number of most recently collected sets of nonce data.

An identification of the user based on the comparison may be assessed 608. The identification may include authentication of a user as being the actual user based on the authentication and/or identification information. If for the same additional information the collected set of nonce data raises a red flag when compared with previously stored sets of nonce data (e.g., when the matches are too identical), there may be an indication that the currently current authentication event is not being performed by the same user. For instance, if the nonce data does match identically, and there is a previous set of nonce data for John Doe, then the current user attempting the authentication may not be John Doe. The same identification and/or authentication may be performed for a user device. For instance, if a user device is identifying itself as a particular device, and the same nonce data is collected as for a previous authentication event, a red flag may be raised. There may be an indication that the current authentication event is not being performed by the same device, and that another device may be participating in a replay attack.

Optionally, an indication of a likelihood of fraud may be provided. For instance, if various authentication and/or identification information identifies as a particular user (e.g., John Doe), and the nonce data identically matches the nonce data from an earlier authentication event of the same user (e.g., John Doe), then a possibility of fraud may be provided. The possibility of fraud may be a binary indicator (e.g., fraud alert, no fraud), or may be provided as a risk value (e.g., numerical value, such as a percentage, or graded value, such as a letter grade). For instance, a fraud grade of 9 may provide a higher likelihood of fraud than a fraud grade of 2.

The collected nonce data may be completely identical to the previously stored set(s) of nonce data to be considered an identical match (e.g. 100% match). A perfect 100% match may be suspicious. For instance, each time a user performs an authentication event, there is likely to be some minor variation. Physically it is extremely unlikely that an individual to perform an authentication event at exactly the same position (e.g., orientation and/or spatial location). In another example, it is also extremely unlikely to capture the exact same image of the environment around the device, or audio data around the device. In another example, it is unlikely for all the components of the device to be in the same state. Similarly, it is physically unlikely that a local clock of the device or an external clock in communication with the device would have the exact same time. Having the exact same characteristics may be an indicator of a type of replay attack.

In some embodiments, when a risk of fraud is detected, one or more individuals may be alerted. For instance, the user that is performing the authentication event may or may not be notified that their attempt at authentication was flagged with some risk of fraud. An entity with whom the user is attempting to conduct a transaction may or may not be notified of the risk of fraud. For instance, if the user is attempting to purchase an item from an e-commerce site, the e-commerce site may be informed that the transaction has been flagged with some risk of fraud. The transaction itself may or may not be permitted to continue. In some instances, if there is any risk of fraud, the transaction may be stopped. Alternatively, if there is some risk of fraud, but it is determined to be low, the transaction may continue while one or more parties are notified of some fraud risk and/or further checks may occur. If a risk of fraud exceeds a threshold level (e.g., reaches a moderate or high risk of fraud), the transaction may be stopped.

Any type of fraud may be detected. In some embodiments, the detected fraud may include a replay attack. During a replay attack, data may be recorded during an authentication event and then replayed in a subsequent authentication event, to pass off as the same user, user device, or cause the authentication event to be completed (e.g., transaction to be completed). The replay attack may be performed by a different user than an initial authentication event, or by the same user as the initial authentication event. The replay attack may be performed using the same device as the initial authentication event, or using a different device as the initial authentication event.

In some instances, the threshold for stopping the transaction may depend on the value of the transaction or other characteristics of the transaction. For instance, for high-value transactions, the threshold for stopping the transaction may be lower than for low-value transaction. For example, if the transaction is for a large monetary amount, even a low risk of fraud may cause the transaction to be stopped, while for a smaller monetary amount, a higher risk of fraud may be required to cause the transaction to be stopped. Alternatively, the threshold for stopping the transaction may be the same for all transactions.

The nonce data may be collected during and/or in response to an authentication event. For instance, the nonce data may be collected when a user is attempting to self-identify and/or authenticate the user. The user may attempt to self-identify and/or be authenticated to access a user account and/or perform a transaction. The nonce data may be used for identification individually, or in combination with other information. The nonce data may be used in authentication of a device and/or user individually, or in combination. The nonce data may be used in authorization of a transaction individually, or in combination with other information, such as financial information. The nonce data may be used for fraud detection alone, or in combination with other information.

In some embodiments, when the nonce data, and/or any other information are analyzed, the data for all may be collected from a single event. All of the nonce data and/or any other information may be assessed simultaneously. In some other embodiments, the nonce data and/or other information may be assessed in sequence or in various orders.

FIG. 7 shows examples of how data may be stored for various transactions, in accordance with embodiments of the invention. The data may be used to identify users and/or fraudulent transactions, in accordance with an embodiment of the invention. Transactions may occur as previously described elsewhere herein.

The data may be the historic data collected from one or more authentication events, such as one or more transactions. The historic data may all be stored together in a single memory unit or may be distributed over multiple memory units. Data distributed over multiple memory units may or may not be simultaneously accessible or linked. The historic data may include data for a single user, or from multiple users. Data from multiple users may all be stored together or may be stored separately from one another. The historic data may include data collected from a single user device or from multiple user devices. Data from multiple user devices may all be stored together or may be stored separately from one another. In some instances, a single user device may be provided for a single user. Alternatively, multiple users may use a single user device, or a user may use multiple user devices when performing authentication events.

The stored data may include information such as a transaction ID, and/or transaction related data. Any discussion herein referring to a transaction may refer to any type of authentication event. For instance, any discussion herein of a transaction may also apply to any authentication of a user and/or access to a user account.

The transaction ID may be a unique identifier that identifies a particular transaction, e.g., TID 1, TID 2, TID 3, TID 4, etc. As previously described, a transaction may be any time a user or user device performs an authentication event. The transaction as provided in the historic data may be stored regardless of whether an issue is flagged and/or any transfer of money, goods, or services is permitted to move forward to completion.

Any type of transaction related data may be stored, e.g., TD1, TD2, etc. The transaction related data may pertain to a user that is allegedly performing the transaction, information about the user's device, or any information that is specific to the transaction itself. The transaction related data may include authentication data. For instance, a username, password or phrase, encrypted key, biometric data (e.g., fingerprint, optical scan, handprint, voiceprint), or any other type of information used to authenticate a user may be provided.

The transaction data may include the user's name, an identifier unique to the user, or any personal information about the user (e.g., user address, email, phone number, birthdate, birthplace, website, social security number, account number, gender, race, religion, educational information, health-related information, employment information, family information, marital status, dependents, or any other information related to the user). The personal information about the user may include financial information about the user. For instance, financial information about the user may include user payment card information (e.g., credit card, debit card, gift card, discount card, pre-paid card, etc.), user financial account information, routing numbers, balances, amount of debt, credit limits, past financial transactions, or any other type of information.

The transaction related data may pertain to the user's device. For instance, a unique device identifier may be provided. Device fingerprint data (e.g., information about one or more characteristics of the device) may be provided. Information collected regarding the device's clock, device's IP address, applications running on the device, or any other information relating to the device may be collected.

Transaction-specific information may be incorporated. For instance, the nature of the transactions, the entities involved the transaction, the time of the transaction, the amount of any finances or exchanges of goods or services for the transaction, account numbers involved in the transaction, or any other information pertaining to the transaction may be provided.

When an authentication event occurs, nonce data may be collected. The nonce data may include information about a state of a user device. The nonce data may be data that is extremely unlikely to repeat in a subsequent authentication event. The nonce information may include data or be derived from data collected at a single point in time, or from multiple points in time (e.g., at various time intervals or continuously within a time range). The nonce data information may be stored a single or multiple sets of data. The nonce data may be denoted as ND1, ND2, ND3, etc.

The historic data may be analyzed to identify a device and/or user, or authenticate a user. As illustrated, the first two transactions may not raise any red flags. For instance, for TID 1, TID 2, the transaction data TD1 and TD2 may be different since they are for different transactions, and the nonce data ND1 and ND2 may also be different since both sets of data are changing.

In the third scenario, TID 3, a red flag may be raised. While a separate transaction is occurring, the same transaction data TD 1 may indicate it's supposed to be the same transaction as TID 1. The nonce data ND3 may show that some information is different between TID 1 and TID 3, so that it is unlikely the same transaction. The fact that the transaction information TD 1 is identical between TID 1 and TID 3 may be contradictory and increase a likelihood of fraud.

The fourth scenario shows a possibility of raising a red flag. For instance, TID 4 is shown to be a separate transaction, but has the same transaction data TD 2 and a second transaction TID 2. The nonce data ND 2 may also be shown to be the same between TID 2 and TID 4. Nonce data may be extremely unlikely to repeat or may never repeat. A repeat of the nonce data may indicate a replay attack. Thus, a high likelihood of a replay attack may be flagged for the fourth transaction TID 4.

While it may be possible for a device to be within a similar condition (e.g., same vicinity) as an event, it is highly improbable that the information will be an exact match (e.g., a highly precise orientation and/or spatial location will be an exact match), particularly when the data includes measurements that are determined to a high level of accuracy and/or precision, as previously described. Thus, there may be some chance of a replay attack in the fourth scenario.

In some scenarios, the nonce data may include nonce information collected at multiple points in time during a duration of an authentication event. In one example, nonce information may be collected when a user initiates an identification/authentication procedure, at the termination of the identification/authentication procedure, or anywhere in between. In another example, nonce information may be collected at the beginning of a transaction, an end of a transaction and one or more points in between. If the nonce information does not change at all during the duration of an authentication event, a red flag may or may not be raised. In some instances, particularly when sensitivity of sensors is very high, it may be unlikely for the nonce data to not change at all. For instance, during an authentication event, a user is likely to joggle a user device a little when interacting with the device (e.g., holding the device, touching a device, entering data into the device), or vibrations from the device itself may be picked up. In another example, during an authentication event audio information is likely to change (e.g., the sounds are not completely steady over time). Alternatively, if the sensors are less sensitive, this may not raise a red flag.

Such scenarios are provided by way of example only. Authentication events may include identifying a device and/or user. For instance, identification information may be used to identify a user and/or device. The identification information may be compared with one or more previously stored sets of identification information. In some embodiments, when the identification information matches a previously stored set of identification information, it may be determined to belong to the same user and/or device.

Optionally, nonce data may be considered when identifying a user and/or device. The nonce data may be analyzed on its own and/or may be compared with one or more previously stored sets of nonce data. If the nonce data identically matches a previously stored set of nonce data, it may be determined that there is a chance of a replay attack. This may suggest that the user is not who the user is purporting to be, or that the user is providing falsified information.

Figure 8:
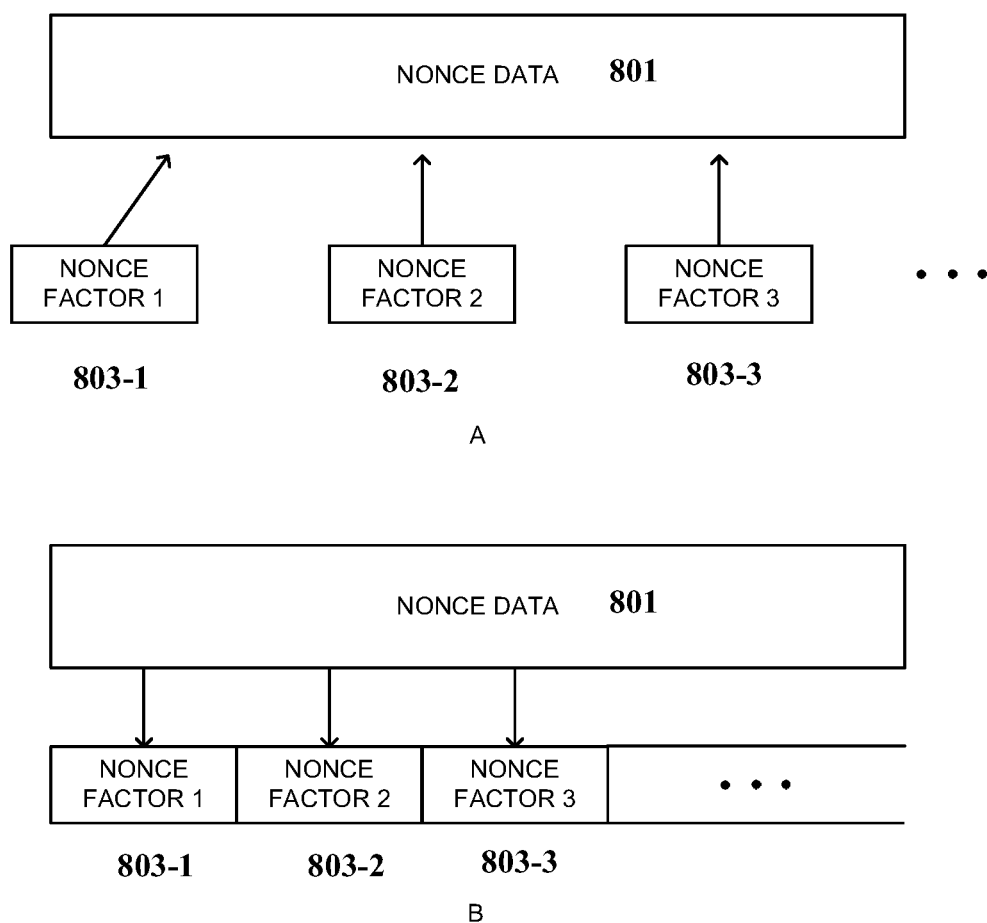
FIG. 8 shows examples of how nonce data may be generated or stored, in accordance with embodiments of the invention.

FIG. 8 shows examples of how nonce data 801 may be generated or stored, in accordance with embodiments of the invention. Any description herein of a nonce data may apply to any type of singularity value. Any description of nonce data may apply to various device measurements, indices, or parameters that may be unlikely to repeat. Any description of nonce factors may apply to various device measurements, indices, or parameters that may be unlikely to repeat. Nonce data may include or be derived from one or more nonce factors.

One or more nonce factors 803-1, 803-2, 803-3 (e.g., Nonce Factor 1, Nonce Factor 2, Nonce Factor 3, . . . ) may be used to form a set of nonce data 801. Nonce factors may include data from various sensors of the device. Nonce factors may include various types of data collected about a state of the device. The nonce factors may each be taken at a single point in time, multiple points in time, or over a time interval. Each of the nonce factors may be from different points in time, or may be from times that coincide and/or overlap. Each of the nonce factors may include data collected from different sensors or types of sensors of the device. Alternatively, two or more of the nonce factors may be collected from the same sensor or type of sensor. In some instances, all of the nonce factors may be collected from the same sensor or type of sensor.

In one example, nonce data 801 may be derived from a single nonce factor. For instance, the single nonce factor may be positional data, or any other type of data as described elsewhere herein. The nonce data may be the raw positional data, or may be derived or processed based on the raw positional data. If the positional data is identical between authentication events, then the nonce data may also be identical between authentication events.

As shown in Scenario A, nonce data 801 may be derived from multiple nonce factors 803-1, 803-2, 803-3. For instance, a first nonce factor may include positional data and a second nonce factor may include audio data. The nonce data may include the raw positional data and the raw audio data together, or may be derived or processed based on the raw positional data and the raw audio data. If the positional data and the audio data are identical between authentication events, then the nonce data may also be identical between authentication events. If both the positional data and audio data are different between authentication events, then the nonce data may be different between authentication events. If at least one of the positional data and the audio data are different between authentication events, then the nonce data may likely be different between authentication events.

If at least one nonce factor of a plurality of nonce factors is different between authentication events, then the nonce data may reflect this difference, and may be different between authentication events. In some instances, if even a single nonce factor is different between authentication events, the nonce data may be different between the authentication events. For instance, each of the nonce factors may need to be a 100% match for the nonce data to be a 100% match between authentication events. This may be like particularly true when the nonce data is derived from the plurality of nonce factors. For instance, the nonce data may be generated based on an algorithm that considers the nonce factors. The nonce data may be a hash of the various nonce factors. The nonce data may include a value or string that may be derived based on the various nonce factors. In some instances, distinguishing information about each of the nonce factors may not be determined from the nonce data. For instance, the separate nonce factors may not be derivable or separated from the nonce data. Alternatively, distinguishing information about each of the nonce factors may be determined from the nonce data. For instance, the separate nonce factors may not be derivable or separated from the nonce data.

As shown in Scenario B, nonce data 801 may be include a collection of multiple nonce factors 803-1, 803-2, 803-3. For instance, a first nonce factor may include positional data and a second nonce factor may include audio data. The nonce data may include the raw positional data and the raw audio data together. If the positional data and the audio data are identical between authentication events, then the nonce data may also be identical between authentication events. If both the positional data and audio data are different between authentication events, then the nonce data may be different between authentication events. If at least one of the positional data and the audio data are different between authentication events, then the nonce data overall may likely be different between authentication events. However, it may be possible to distinguish which sets of nonce factors are different between the authentication events and which are different.

If at least one nonce factor of a plurality of nonce factors is different between authentication events, then the nonce data may reflect this difference, and may be different between authentication events. In some instances, if even a single nonce factor is different between authentication events, the nonce data may be different between the authentication events. For instance, each of the nonce factors may need to be a 100% match for the nonce data to be a 100% match between authentication events. However, each of the nonce factors may be distinguishable so it can be determined which nonce factors are a match and which aren't. For instance, the nonce data may just be a collection of various nonce factors, or may append various nonce factors together. In some instances, distinguishing information about each of the nonce factors may be determined from the nonce data. For instance, the separate nonce factors may be derivable or separated from the nonce data. Alternatively, distinguishing information about each of the nonce factors may be determined from the nonce data. For instance, the separate nonce factors may not be derivable or separated from the nonce data.

Allowing the various nonce factors to be individually distinguishable may advantageously permit greater granularity into determination of whether a replay attack is occurring. For instance, different nonce factors may be weighted differently. For instance, nonce factors that are more likely to be different between authentication events may be weighted more than nonce factors that may be less likely to be different between authentication events. In one example, it may be extremely unlikely that audio data may be identical between authentication events. However, while it is likely there may be some variation in a state of charge of a battery of the device, it may be a factor where repetition may be more possible. In such an event, the audio data may be weighted more. The weighting may be considered during an assessment of a replay attack.

Looking at individual factors may also be useful when there may only be certain portions of the data that are likely to be recorded and/or replayed. For instance, in some embodiments, during a replay attack, all data pertaining to the device may be recorded and replayed. In such a scenario, any deviation in any of the factors may reduce the likelihood that a replay attack has occurred. In other embodiments, during a replay attack, only selected data pertaining to the device may be recorded and replayed. For instance, only positional data about a device may be recorded and replayed while audio data is not replayed. In such as a scenario, the 100% match of one of the factors (e.g., position) may be sufficient to provide a likelihood that a replay attack has occurred. In some embodiments, the systems and methods provided herein may take into account how nonce data is collected and/or being considered. If the nonce data is collected in a way that any replay would automatically put all the nonce factors together, then any deviation in the nonce data may be sufficient to indicate that a replay attack is unlikely. If the nonce data is collected in a way that the separate nonce factors could be separated and/or provided individually, then a 100% match of a nonce factor, particularly a nonce factor that is unlikely to repeat, may be enough to provide a high likelihood of a replay attack.

In determination of whether a replay attack has occurred, the various individual nonce factors may be considered (e.g., as shown in Scenario B). Alternatively, just the overall nonce data may be considered (e.g., as shown in Scenario A), and any degree of difference may reduce the likelihood of a replay attack. In some instances, the degree of difference may be considered in determining a likelihood of a replay attack. For instance, if all nonce factors are identical, there may be a high likelihood of a replay attack. If a single nonce factor is identical, and is one where repetition may be possible, then a moderate likelihood of replay attack may be provided, if no nonce factors are identical, then a low likelihood of replay attack of may be provided.

Figure 9:
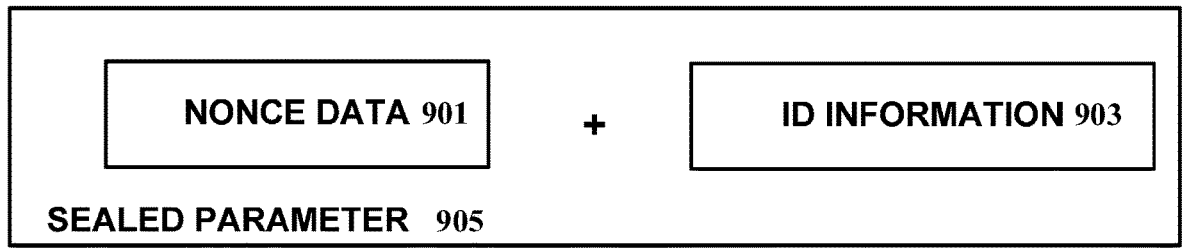
FIG. 9 shows how nonce data and identification may be used to form a parameter, in accordance with embodiments of the invention.

FIG. 9 shows how nonce data and identification may be used to form a parameter 905, in accordance with embodiments of the invention. Any description herein of nonce data may also apply to a sealed parameter, as provided herein. The sealed parameter 905 may be a replay parameter, which may include nonce data 901 and some form of additional information, such as identification information 903. In some embodiments, the identification data 903 may be a static data that pertain to a user, a physical token, a device, or a service. The nonce data 901 may be dynamic data that changes from transaction to transaction. Thus the sealed parameter of the present invention may naturally change from transaction to transaction.

The nonce data 901 may be any type of nonce data, such as nonce data derived from one or more nonce factors, or that may include the one or more nonce factors in an individually accessible format. The nonce data may or may not itself be sealed. For instance, the nonce data may or may not be broken up or divided or derivable into its original nonce factors. Sealed nonce data may not permit the original nonce factors and/or raw data used to derive the nonce data to be accessed. Non-sealed nonce data may allow the original nonce factors and/or raw data used to derive the nonce data to be accessed. The original nonce factors and/or raw data may be checked to see if the nonce data is valid. Invalid nonce data may be indicative of a fraudulent event. A valid nonce data may conform to a pre-defined format or be within a pre-defined range. The pre-defined format or pre-defined range may be associated with the original nonce factor. The data corresponding to a nonce factor may be determined valid when the value of the data is within a pre-defined range and/or match a pre-defined format. For instance, the orientation data should be in the range (in a four digits format) from 0000 to 3600, if the number corresponding to the orientation data is detected to be out of the range such as 3800, it may be considered suspicious that the data is changed maliciously by a fraudster.

The identification information 903 may include any type of information as described elsewhere herein. For instance, the identification information may pertain to a user identity, identity of a user device, and/or may pertain to an authentication event (e.g., transaction). The identification may be a single piece of information (e.g. unique identifier) or may include multi-factored information (e.g., any combination of other types of information as described elsewhere herein).

The nonce data and identification information may be associated with one another. The nonce data and identification information may be linked or connected to one another. The nonce data and identification information may be used to derive a sealed parameter. If the nonce data is identical between authentication events, the sealed parameter may be identical between authentication events. In some instances, the sealed parameter may be identical between authentication events if the nonce data is identical and the identification information is identical. If the nonce data is identical and the identification information is not identical, the sealed parameter may optionally not be identical.

The nonce data may be tied to an authentication event, where a purported user took part in the authentication event. For a subsequent authentication event, if the nonce data is different and the identification information for this authentication event is different, this may not raise any red flags, because it is likely that the nonce data would be different for a different authentication event. If the nonce data is different, but the identification information is the same, this may raise a question. For instance, if it is referring to the identical information is referring to the same authentication event, then the nonce data should be the same and would not be different. In another example, if the nonce data is the same and the identification information is different, this may raise a red flag and a likelihood of a replay attack. For instance, if a different authentication event is occurring, it is extremely unlikely that the nonce data would be a match. The nonce data is selected to include data that should change between authentication events. In another example, if the nonce data and the identification information is the same, this may occur if data is being recorded multiple times for the same authentication event. Alternatively, any indication of identical nonce data, even if the identification information is purportedly the same, may be a red flag or provide some possibility of a replay attack.

In some embodiments, the sealed parameter 905 may include the nonce data and the identification information in an individually distinguishable or readable format. For instance, the nonce data may be assessed and read, and the identification information may be assessed and read. The sealed parameter may permanently link together the nonce data and the identification information in an inseparable format. In alternative embodiments, the sealed parameter may not allow the nonce data and the identification information to be individually distinguished or readable.

In some embodiments, nonce data and identification data may be encrypted as a sealed parameter 905. The nonce data and identification data may be used as input parameters of a secret encryption algorithm implemented in order to produce the sealed parameter. Various methods can be used for encrypting the parameter. For example, symmetrical keys may be used for encryption and decryption. These keys can be composed from a sentence or a series of non-meaningful characters, and encryption is done by performing a bitwise XOR operation on data chunks (e.g., original data, structure data and Reed-Solomon data) that compose the parameter (e.g., nonce data and identification data). In another example, the nonce data and identification data can be encrypted using a 1024 bit polymorphic cipher, or, depending on the export controls, an AES 256 bit encryption method. Furthermore, encryption can be performed using remote key (seeds) or local keys (seeds). Alternative encryption methods can be used as would be understood by those skilled in the art, for example, SHA256, AES, Blowfish, RSA, etc. In some cases, a software and/application on the user device and other authentication system or entities involved in the transaction may possess the encryption key and the encryption method.

In some embodiments, the sealed parameter data may be used in performing an identification and/or authentication of the user. This may be used in a transaction process. A likelihood of fraud may or may not be assessed, using the sealed parameter. The sealed parameter data may optionally be used in a process similar to FIG. 6, where the sealed parameter may be stored in a historical database and compared. Any description of the nonce data may apply to sealed parameter data.

Figure 10:
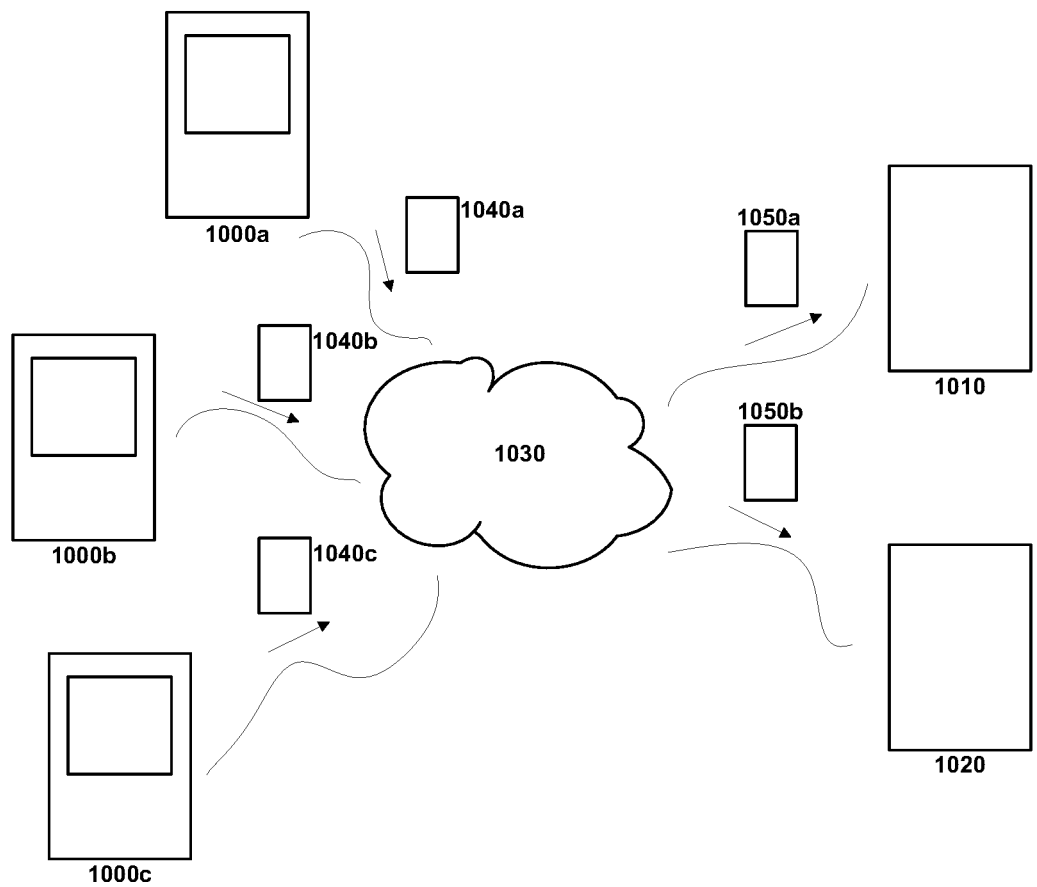
FIG. 10 provides examples of entities involved in a transaction, in accordance with embodiments of the invention.

FIG. 10 provides examples of entities involved in an authentication event, in accordance with embodiments of the invention. As previously described, any type of authentication event may occur as described elsewhere herein may be used, such as various transactions. Authentications may be performed for various transactions that may or may not include the exchange of money and/or goods or services. Transactions may or may not include the exchange of information. Authentications may include any situation where a user may verify a user or user device's identity.

An authentication system may include one or more user devices 1000a, 1000b, 1000c that may communicate with one or more external devices 1010, 1020. The one or more user devices may be associated with one or more respective users. Communications may occur over a network 1030 or may occur directly. Data from the one or more user devices 1040a, 1040b, 1040c may be conveyed to the one or more external devices. In some embodiments, data received by a first external device 1050a may be the same as data received by a second external device 1050b, or the data may be different. In one example, a first external device may be or belong to an authentication server system (e.g., a server system configured to provide secure authentication), and/or a second external device may be or belong to one or more third parties (e.g., any transaction entity as described elsewhere herein, such as a merchant's system, a broker's system, or other entity requiring identity authentications).

The network 1030 may be a communication network. The communication network(s) may include local area networks (LAN) or wide area networks (WAN), such as the Internet. The communication network(s) may comprise telecommunication network(s) including transmitters, receivers, and various communication channels (e.g., routers) for routing messages in-between. The communication network(s) may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), WiMAX, or any other suitable communication protocols.

The user devices 1000a, 1000b, 1000c may include one or more characteristics of the various embodiments of the user devices described elsewhere herein. For example a user device may have one or more characteristics, components, or functions of the user device of FIG. 1. In some embodiments, a user device may include one or more processors configured to handle various requests from the user, the first external device 1010, and/or the second external device 1020. The user device may also include or have access to one or more databases for storing various information including but not limited to, transaction information, transaction data, authentication information, identification information, financial information, account information of the user associated with the user device, device information of the user device, device identifier of card reader(s) which may have interactions with the user device, nonce data, historic authentication data, and/or usage data associated with the user of the user device (e.g., other activity data associated with the user). Various types of user devices may be used to facilitate an authentication. An authentication system may include multiple types of user devices that may be used simultaneously.

The various types of user devices may include, but are not limited to, a handheld device, a wearable device, a mobile device, a tablet device, a laptop device, a desktop device, a computing device, a telecommunication device, a media player, a navigation device, a game console, a television, a remote control, or a combination of any two or more of these data processing devices or other data processing devices. Optionally a user device may be able to read a magnetic card, such as any type of payment card. The user device may be capable of performing an authentication read of a payment card. The user device may accept a swipe of the payment card and be able to read magnetic information from the payment card. The use device may be capable of reading one or more swipe characteristics of the payment card, such as swipe speed, direction, angle, variation, and/or inherent magnetic properties of the payment card. Alternatively, the user device may connect to a card reader having any of the functionality described herein.

A first external device 1010 may include one or more processors. The first external device may be an authentication server system. The first external device may include or have access to one or more databases. The first external device may be in communication with one or more user devices 1000a, 1000b, 1000c. The first external device may be in communication with various user devices with aid of a communication unit (e.g., an I/O interface). The first external device may be in communication with various transaction entity systems (e.g., merchant's system, broker's system, credit card companies, social network platforms, and/or other entities). The first external device may be in communication with various external server systems with aid of one or more I/O interfaces. The I/O interface to the user devices and/or the card readers may facilitate the processing of input and output associated with the user devices and/or the card readers respectively. For example, the I/O interface may facilitate the processing of a user input associated with a request for secure authentication. The I/O interface to external server systems may facilitate communications with one or more third-party entities (e.g., merchant's system, broker's system, credit card companies, social network platforms, and/or other entities).

The first external device may comprise memory storage units which may comprise non-transitory computer readable medium comprising code, logic, or instructions for performing one or more steps. The one or more processors of the first external device may be capable of executing one or more steps, for instance in accordance with the non-transitory computer readable media. In some embodiments, the one or more processors may generate or receive requests for performing secure authentications, processing the requests, comparing nonce data, identifying information needed for the authentications, performing the authentications, and returning the authentication results in response to the requests. The one or more databases may store various information, including but not limited to, corresponding nonce data, account information associated with each user, device information of the user device (e.g., a user device identifier), historic authentication data, and/or usage data associated with each user (e.g., activity data associated with each user).

The data stored about a user may include financial information about the user. The financial information may include card reader about the user and/or account information about the user. The card information of a user may include a card type (e.g., credit card, membership card, identity card, etc.), a card issuer (e.g., a credit carrier, a company, the government, etc.), a credit carrier type (e.g., Visa, Mastercard, American Express, Discover, etc.), a card number, a card expiration date, and/or a card security code. The account information may include user's name, user's mailing address, user's telephone number, user's email address, user's birthdate, user's gender, user's social security number, user account ID and associated password, or any other personal information about the user.

Transaction related data such as nonce data may be stored. The nonce data may be associated with the user or a user device for a particular authentication event (e.g., transaction). The nonce data may be derived or may include information about conditions or parameters of the device that are extremely unlikely to repeat (e.g., chance of repetition is less than or equal to 1%, 0.5%, 0.1%, 0.05%, 0.01%, 0.005%, 0.001%, 0.0005%, 0.0001%, 0.00005%, 0.00001%, 0.000005%, or 0.000001%), individually or in combination. The nonce data may represent a singularity value for the device at that particular point in time or time interval.

The various types of information (e.g., financial information, user information, device information, and/or nonce data) may be obtained and stored in the databases of the first external device 1050a during various authentication activities of the user. The first external device may have access to the databases or a subset of the databases for storing the various types of information. The various types of information may or may not also be obtained and stored during an initial registration of the user at the first external device (e.g., an authentication server system). In some embodiments, the various types of information may be accessible by the first external device. For instance, the second external device (e.g., a third-party entity) 1020 may or may not be able to access the same databases or a subset of the same databases for storing the various types of information.

The second external device 1020 may be or belong to a third-party entity. The third-party entity may be implemented on one or more standalone data processing apparatuses or a distributed network of computers. In some embodiments, the entity may also employ various virtual devices and/or services of third party service providers (e.g., third-party cloud service providers) to provide the underlying computing resources and/or infrastructure resources. In some embodiments, upon user's approval and in pursuance to related privacy policies, the third-party transaction entity may or may not store card information, account information, usage data, nonce data, and/or device information associated with the user. One or more third-party transaction entities may comprise e-commerce systems, retail systems, financial institutions (e.g., banks, brokers, and credit card companies), merchant's systems, social networking platforms, and/or other entities which the user performs authentications with. In some instance, the third-party entity may be an online e-commerce, and a user nonce data relating to a user's device may be analyzed to complete or deny a purchase of a product online. In some instance, the third-party entity may be a broker system, and nonce data may be analyzed for verifying transfers of funds between the user's financial account and the broker system. In some instance, the third-party entity may be a social networking platform which hosts a plurality of user accounts. A user may use the nonce data for verifying user's login to the social networking platform.

As previously described, data accessible by the first external device 1050a and the second external device 1050b may be the same or may differ. In some embodiments, the first external device may be an authentication system that may be capable of accessing a greater amount of data, and/or the second external device may be a third-party entity that may be capable of accessing a lesser amount of data. The first external device and the second external device may both be capable of accessing nonce data and/or any authentication event related data (e.g., transaction data). Alternatively, the first external device may be capable of obtaining the nonce data while the second external device may not be capable of accessing the nonce data, or vice versa. Optionally, authentication event related data or a subset thereof may be obtained by both the first external device and/or the second external device, or by only one of the first external device or the second external device.

Data 1040a, 1040b, 1040c from the one or more user devices may be accessible by the first external device and/or second external device, as previously described. The data from the one or more user devices may include nonce data and/or data about conditions or parameters of the device that may be used to derive or generate nonce data. For example, for an authentication event, the user devices may send corresponding nonce data and/or authentication event related information. The data may be sent in response to the authentication event. The data may be pushed by the user devices or may be pulled by the first external device or the second external device. The data may be sent in real-time. Alternatively, the data may be sent on a periodic basis or in response to a schedule. In some embodiments, the user devices may send data about a state of the device which may be used to generate the nonce data elsewhere (e.g., at the first external device and/or the second external device). The data about the state of the device may include data collected from one or more sensors of the device, as described elsewhere herein. The data about the state of the device may include data collected with aid of one or more sensors off-board the device. In some embodiments, the data about the state of the device may include raw or pre-processed data from one or more sensors on- or off-board the device.

Steps for performing secure authentications may be implemented according to various embodiments. Requests for authentication may be initiated at user side. In some embodiments, a user may initiate a request for a secure authentication to complete a transaction. For example, during a transaction or a login process, the user may send a user input (e.g., by pressing a button or touching a touch screen of a user device) to indicate the user's intention to initiate a secure authentication for the transaction or the login process. In some embodiments, requests for secure authentication events may be initiated from a user device. In some instances, a request for a secure authentication may be initiated from an external device, such as an authentication server system. In some instances, a request for a secure authentication may be initiated from a third-party entity.

During initial registration of a user account with an authentication server system, the user may register for relevant account settings to require secure authentication for activities associated with this user account. During the following activities, an authentication server system may recognize a request for a transaction or a login process associated with the user account. In response to the request for the transaction, the authentication server system may send a request for a secure authentication to complete the transaction or the login process. During registration and/or the following account activities, the user may register to require authentication for all activities or some activities with certain conditions.

During initial registration of a user account with a third-party entity, the user may register for relevant account settings to require secure authentication for activities associated with this user account. For example, during initial setup of a user account to activate or manage a card on a bank's website or within the bank's application, the user may select to perform secure authentications for one or more transactions. During the following transactions, once the third-party transaction entity recognizes a transaction associated with the user account is requested, a secure authentication is required to complete this transaction using the card. During registration and/or the following account activities, the user may register to require authentication for all activities or some activities with certain conditions.

The secure authentication may require an analysis of the nonce data, as described elsewhere herein. The secure authentications may be required or provided as an option by an authentication server system for one or more activities. In some embodiments, the secure authentications may be required by a third-party entity. For example, a bank system or a broker system may require secure authentications to be performed to complete all or certain transactions (e.g., flagged transactions, transactions above a predetermined limit amount, or randomly selected transactions). In some instances, a secure authentication may be optional, but the third-party entity may offer rewards (e.g., cashback or bonus reward points) to the user if the user chooses to perform a secure authentication to complete the transaction.

The secure authentications may be required for all activities or some activities associated with the user account. For example, a secure authentication may be required when a transaction involves an amount of money equal to or greater than a predetermined threshold amount. For example, the predetermined threshold amount may be $100, $200, $500, $1000, $5000, $8000, $ 10,000, $15,000, $20,000. The threshold amount may be determined by the user, an authentication server system, or a third-party entity. In some embodiments, secure authentications may be required when the activities are identified as high risk activities. For example, the high risk activities may involve suspicious/ mismatched user identity associated with the user account, suspicious transaction locations, repetitive entering of wrong user information, and/or flagged user account for previously associated fraudulent activates. In some embodiments, high risk activities may involve high speed transactions, such as requiring for funds to be transferred within a short period of time. When high speed transactions are identified, further security checks, such as nonce data analysis, may be required from the user. In some instances, the use of the further authentication may allow for online activities to occur in situations where previously in-person activity was required. The further assurances of a user's identity may aid in giving entities comfort in permitting larger scale transactions.

Nonce data may be used to perform an authentication for a transaction of exchanging money, goods, and/or services with a third-party entity. For example, the user may purchase an item online from the third-party entity (e.g., an e-commerce) using a user device (e.g., a tablet or a mobile phone). The user may perform the authentication on a website or in an application associated with the third-party entity.

In one example, after selecting the desired item to purchase and entering required information for the transaction (e.g., desired quantity of the item and relevant user information), the user may be prompted to perform a secure authentication. For example, when the user wants to purchase an item priced at $1000, the user may receive a notification on the display of the user device which requires the secure authentication. The notification may cause nonce data to be generated for the transaction. The nonce data may be compared with historical nonce data to confirm that the nonce data is not repeating. If the nonce data is repeating, there may be further authentication checks required, or a red flag may be raised that there is a higher likelihood of a fraudulent event (e.g., replay attack). This may or may not cause the transaction to be denied or delayed.

In some other examples, the user may log into a registered user account on a website or in an application, such as a public service, an online voting system, a social networking service, etc. The user may receive a notification during the login process to perform the secure authentication, such as an identity verification. The notification may cause nonce data to be collected and analyzed in order to complete the identity verification.

In some embodiments, the third-party entity may generate the request to perform the secure authentication per requirement of the third-party entity or per user accounting settings registered with the third-party entity. The third-party transaction entity may send the request to the user device for display. Nonce data may be analyzed as a result.

In some alternative embodiments, the user may indicate the intention to perform the secure authentication via a user input on the user device. For example, the user may click an icon on the display or press a button on the user device to request for the secure authentication. This may optionally initiate an analysis of the nonce data collected relating to the state of the device.

During a login process or any other type of authentication event, a secure authentication may be required by the authentication server system, the third-party entity, or the user. In response to the request, nonce data may be collected and/or analyzed. Nonce data can be obtained and transmitted from the user device to the authentication server system and/or the third-party entity directly or indirectly. The user device information (e.g., user device identifier) may also be transmitted to the authentication server system and/or the third-party entity for verification.

The authentication server system may store or have access to various historic authentication information or registration information that can be used for authentication. The information may include but is not limited to, historic nonce data, transaction data, user account information, user device identifier, or any other type of information as described elsewhere herein. The third-party entity may also store or have access to various sets of historic authentication information or registration information that can be used for authentication, such as historic nonce data, transaction data, user account information, user device identifier, or any other type of information as described elsewhere herein.

The authentication may be performed by the authentication server system solely or the third-party entity solely. In some instances, the authentication may be performed by both systems in a combined manner. For example, some information may be verified at the third-party transaction entity, such as user account information, or user device identifier. Meanwhile, other information may be verified at the authentication server system, such as nonce data.

In some instances, the third-party entity may store or have access to only user account information without having access to other confidential and/or financial information of a user, such as nonce data. Thus when an authentication with the third-party entity requires an authentication, the third-party entity may designate the authentication server system to perform an authentication. The authentication server system may then perform the authentication and return a message to the third-party transaction entity indicating whether the authentication is approved or not. The authentication server may return the message based on an analysis of nonce data for the particular authentication event. The transaction may then be approved or rejected accordingly by the third-party entity.

In some embodiments, the authentication server system may be optional in the authentication system. Separate third-party entities may perform any step or all steps of the authentication.

In some embodiments, the authentication server system can simultaneously perform authentication for multiple authentications for different activities. The authentication server system may simultaneously perform authentication for multiple separate third-party entities. Information stored at or accessible to the authentication server system can be collected over multiple transactions associated with various third-party entities. For example, nonce data associated with various third-party entities may be accessible by the authentication server system. This may allow intelligence gathered from multiple transactions to be used in performing the authentication. The authentication server system may have access to data repository that the third-party entities individually may not have access to.

The authentication server system and/or the third-party entity may analyze the received information, and compare the received information with the corresponding information obtained from historic authentications and/or registrations. The comparison may include comparison of nonce data. The user login or transaction may be approved, rejected, or flagged as a risk authentication/login based on the comparison result. The user may be notified by the authentication server system or the third-party entity once the login or authentication is approved, rejected, or flagged.

Various embodiments may exist for evaluating the match between the collected data and historic authentication data or registration data. In some examples, when the collected data from the card reader matches the corresponding historic authentication data or registration data, a message may be sent to the third-party transaction entity to approve the authentication. In some examples, if nonce data (and/or one or more nonce factors of the nonce data) do not match, the authentication can be approved.

For instance, the collected nonce data may need to be at least slightly different from the previously stored set(s) of nonce data associated with the user and/or user device. In some instances, a perfect 100% match may be suspicious. For instance, each time a user device is used to perform an authentication, there is likely to be some minor variation. Physically it is extremely unlikely that the user device have exactly the same conditions and characteristics. Having the exact same conditions and characteristics may be an indicator of a type of replay attack.

Depending on authentication analysis, which may include the analysis of the nonce data (and optionally additional analyses of other factors), an indication of fraud may be provided. The indication of fraud may relate to an indication of a replay attack. As previously described, an indication of fraud may provide an indication of a level of fraud risk. The level of fraud risk may optionally depend on the analysis of the nonce data. The level of fraud risk may depend on whether collected nonce data matches historic nonce data. The level of fraud risk may depend on how closely the nonce data matches the historic nonce data, and/or which nonce factors match. For instance, if the nonce data is a perfect a 100% match for all factors, the level of fraud risk may be very high. If the nonce data is mostly a match, but one of the nonce factors are different, the level of fraud risk may be moderate, and if most or none of the nonce factors are a match, the level of fraud risk may be low. The level of fraud risk may be proportional to how high a match the nonce data is. A higher match (e.g., greater number of factors that are a match) may correlate to a higher risk of fraud, a lower match may correlate to a lower risk of fraud.

In some embodiment, analysis of the nonce data may relate to a likelihood of a replay attack. Other types of fraud analysis may occur for the transaction. For instance, a fraud analysis may include an assessment of a likelihood of a replay attack, as well as other types of fraudulent attacks (e.g., phishing, man in the middle attacks, etc.). Other data, such as data regarding the user device, user account, transaction data, or any other type of data described elsewhere herein, may be analyzed to detect the various types of fraud.

Depending on the fraud analysis, authentication may or may not be confirmed for the user and/or user device. This may optionally permit a transaction to be completed, or delay or deny the transaction.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method of performing anti-replay analysis, said method comprising:

providing a device configured to permit a user to perform a transaction, wherein the transaction is performed via a display of the device;

collecting device state data comprising a plurality of parameters including at least (1) a physical state of the device with aid of one or more sensors on-board the device, and (2) operational data specific to a component of the device, wherein the component is selected from the group comprising a power supply unit, a processor, a sensor, the display, and a memory, wherein the device state data is unique to the device at a moment in time during which the device state data is collected;

obtaining identification information about the device or the user;

determining whether the plurality of parameters of the device state data each individually have a value that falls within a corresponding pre-defined range associated with a respective parameter of the device state data;

determining the device state data is valid when the value of each of the plurality of parameters of the device state data is within the corresponding pre-defined range;

comparing, with aid of one or more processors, the device state data and the identification information with previously collected device state data and previously collected identification information, wherein said comparison includes an individual comparison of the plurality of parameters including at least (1) data about the physical state of the device and (2) the operational data specific to the component of the device, with previously collected parameters including at least (1) previously collected data about the physical state of the device, and (2) previously collected operational data specific to the component of the device; and determining, with the aid of the one or more processors, a presence of a replay attack based on (1) whether the plurality of parameters of the device state data and the previously collected device state data are identical and (2) whether the plurality of parameters of the device state data is valid, wherein the presence of the replay attack is based on whether the operational data specific to the component of the device and the previously collected operational data specific to the component of the device are identical.

2. The method of claim 1, wherein the device state data comprises data collected by different types of sensors.

3. The method of claim 2, further comprising weighting the data collected by different types of sensors when determining the presence of the replay attack.

4. The method of claim 2, wherein the device state data is encrypted such that the data collected by the different types of sensors are not accessible to the one or more processors.

5. The method of claim 2, wherein the device state data is not encrypted, and wherein the data collected by the different types of sensors are individually compared with the previously collected device state data according to the types of sensors to determine the presence of the replay attack.

6. The method of claim 1, wherein the one or more sensors comprises inertial sensors including accelerometers, gyroscopes, magnetometers, or piezoelectric sensors.

7. The method of claim 1, wherein the device state data comprises positional information about the device.

8. The method of claim 1, wherein the device state data further comprises data indicative of environmental information collected by the one or more sensors on-board the device.

9. The method of claim 8, wherein the data indicative of environmental information includes visual, thermal, or audio data about the environment.

10. The method of claim 1, wherein the transaction involves exchange of money, goods, services, or information.

11. The method of claim 1, wherein the operational data specific to a component of the device includes whether the display is turned on or off, data about an image shown on the display, or a determination of power consumed by the display at the moment in time during which the operational data is collected.

12. The method of claim 1, wherein the operational data specific to a component of the device includes a power supply state of charge, a power supply depletion rate, or a temperature of the power supply unit, at the moment in time during which the operational data is collected.

13. The method of claim 1, wherein the operational data specific to a component of the device includes an amount of data transmitted out or received in the communication unit, or identity or type of external device or network communicating with the communication unit, at the moment in time during which the operational data is collected.

14. The method of claim 1, wherein the operational data specific to a component of the device includes a distribution of stored memory, or a level of fragmentation of data, at the moment in time during which the operational data is collected.

15. The method of claim 1, wherein the operational data specific to a component of the device includes a level of usage of the processor, at the moment in time during which the operational data is collected.

16. The method of claim 1, wherein the operational data specific to a component of the device includes whether the sensors are on or off, whether they are collecting data, data collection frequency, direction of data collection, or sensitivity of data collection, at the moment in time during which the operational data is collected.

17. The method of claim 1, wherein the operational data specific to a component of the device includes a temperature of the component, at the moment in time during which the operational data is collected.

18. A system for performing anti-replay analysis, said system comprising:
  a server in communication with a device configured to permit a user to perform a transaction via a display of the device, wherein the server comprises (i) a memory for storing previously collected device state data, previously collected identification information, and a first set of software instructions, and (ii) one or more processors configured to execute the first set of software instructions to:
  receive device state data comprising a plurality of parameters including at least (1) a physical state of the device with aid of one or more sensors on-board the device, and (2) operational data specific to a component of the device, wherein the component is selected from the group comprising a power supply unit, a processor, a sensor, the display, and a memory, wherein the device state data is unique to the device at a moment in time during which the device state data is collected, wherein the device state data is collected with aid of one or more sensors on-board the device;
  receive identification information about the device or the user;
  determine whether the plurality of parameters of the device state data each individually have a value that falls within a corresponding pre-defined range associated with a respective parameter of the device state data;
  determine the device state data is valid when the value of each of the plurality of parameters of the device state data is within the corresponding pre-defined range;
  compare the device state data and the identification information with previously collected device state data and previously collected identification information, wherein said comparison includes an individual comparison of the plurality of parameters including at least (1) data about the physical state of the device and (2) the operational data specific to the component of the device, with previously collected parameters including at least (1) previously collected data about the physical state of the device, and (2) previously collected operational data specific to the component of the device; and
  determine a presence of a replay attack based on (1) whether the plurality of parameters of the device state data and the previously collected device state data are identical and (2) whether the plurality of parameters of the device state data is valid, wherein the presence of the replay attack is based on whether the operational data specific to the component of the device and the previously collected operational data specific to the component of the device are identical.

19. The system of claim 18, wherein the device state data further comprises data indicative of environmental information collected by the one or more sensors on-board the device and the one or more sensors comprises at least an image sensor.

* * * * *